United States Patent
Kolacz et al.

(10) Patent No.: US 9,272,171 B2
(45) Date of Patent: Mar. 1, 2016

(54) PIVOTING FLUID CONDUIT SEQUENCING MECHANISM

(71) Applicant: TASK FORCE TIPS, INCORPORATED, Valparaiso, IN (US)

(72) Inventors: David J. Kolacz, Plymouth, IN (US); William D. Walker, Portage, IN (US); Robert W. Steingass, Valparaiso, IN (US)

(73) Assignee: TASK FORCE TIPS, INCORPORATED, Valparaiso, IN (US)

( * ) Notice: Subject to any disclaimer, the term of this patent is extended or adjusted under 35 U.S.C. 154(b) by 358 days.

(21) Appl. No.: 13/833,518

(22) Filed: Mar. 15, 2013

(65) Prior Publication Data

US 2014/0034338 A1 Feb. 6, 2014

Related U.S. Application Data

(60) Provisional application No. 61/623,351, filed on Apr. 12, 2012.

(51) Int. Cl.
- *B05B 15/08* (2006.01)
- *A62C 31/28* (2006.01)
- *F16L 27/04* (2006.01)
- *F16L 27/06* (2006.01)

(52) U.S. Cl.
CPC ............... *A62C 31/28* (2013.01); *F16L 27/04* (2013.01); *F16L 27/06* (2013.01)

(58) Field of Classification Search
CPC ......... A62C 31/02; A62C 31/28; F16L 27/04; F16L 27/06; B05B 15/06; B05B 15/08
USPC .......... 239/587.1, 587.2, 587.3, 587.4, 587.5, 239/176; 285/263
See application file for complete search history.

(56) References Cited

U.S. PATENT DOCUMENTS

| | | | |
|---|---|---|---|
| 6,745,957 B2 * | 6/2004 | Parey | 239/569 |
| 7,533,906 B2 * | 5/2009 | Luettgen et al. | 285/146.1 |
| 7,644,777 B2 * | 1/2010 | Combs et al. | 169/52 |
| 7,802,630 B2 * | 9/2010 | Combs et al. | 169/52 |
| 2005/0145727 A1 * | 7/2005 | Steingass et al. | 239/587.2 |

* cited by examiner

*Primary Examiner* — Justin Jonaitis
*Assistant Examiner* — Juan C Barrera
(74) *Attorney, Agent, or Firm* — Marshall, Gerstein & Borun LLP

(57) ABSTRACT

A new firefighting monitor has multiple pivoting conduit segments and a synchronization mechanism with engaging faces that automatically restrain pivoting of an intermediate conduit segment with respect to an upstream conduit segment when the downstream conduit segment is pivotable with respect to the intermediate conduit segment, and automatically restrain pivoting of the downstream conduit segment with respect to the intermediate conduit segment when the intermediate conduit segment is pivotable with respect to the upstream conduit segment. In a variation, an intermeshed gear train causes a downstream conduit segment to pivot proportionately with respect to an intermediate conduit segment as the intermediate conduit segment pivots with respect to the upstream conduit segment.

7 Claims, 40 Drawing Sheets

PIVOTING FLUID CONDUIT SEQUENCING MECHANISM

BACKGROUND

Fires and risks of fires in hazardous locations often require applications of large volumes of water or other extinguishing agents such as foam, compressed air foam, clean agents (gas), or dry chemicals, or combinations thereof. For safety, firefighters prefer to dispense these fluids from a sufficiently safe distance. This requires the fluids to be dispensed at high velocities, and the velocity through the nozzle in turn causes substantial nozzle reaction forces. These forces are often higher than can be resisted by human muscle power.

To absorb these reaction forces and transmit them to the ground or a substantially stationary object, fluid projecting devices called monitors are sometimes used. These monitors are arranged to direct the fluids in any of a range of desired trajectories, generally having at least one degree of freedom. Monitors generally include flow path designs and mechanisms that enable firefighters to adjust the trajectory easily and with little force.

The structural elements that enable a monitor to deliver fluid through a range of trajectories may be broadly divided into three classifications:
  Swivel joints that form rotary unions;
  Flexible flow paths that are formed by hoses or bellows; and
  Ball-in-socket arrangements.

The actuating mechanisms used by a firefighter to adjust these structural elements to a particular trajectory generally fall into these three classifications:
  The structural elements are moved directly by human force, and remain stationary of their own accord or are secured with a means such as a locking knob, clamp, or friction slip clutch;
  The structural elements are moved under mechanical advantage by a human-operated adjusting mechanism, such as a worm/worm wheel, lever, rack & pinion, screw, cables, chains, and push/pull rods; and
  The structural elements are moved by force from an external source, such as a hydraulic, electric, pneumatic, or water powered drive motor with gear reduction, or by a cylinder, piston, or rotary actuator driven by oil from an external source or by water from within the monitor. These arrangements enable a firefighter to operate the monitor under power while either at the monitor or from a distance via wired or wireless operation.

Fire monitors with a wide variety of configurations have been patented over the course of time. These configurations include combinations of a wide variety of different structural elements that provide adjustability of the trajectory, in combination with various mechanisms for firefighters to use to adjust the monitor to a particular trajectory or direction.

This invention relates generally to firefighting monitors that use pivotable conduit segments, and more particularly to firefighting monitors like those described in US reissue patent RE40441. The monitor illustrated in that patent has a plurality of conduit segments in the form of ball-in-socket joints that provide at least one degree of freedom for swiveling the conduit segment under pressure. In that monitor, the forces due to water pressure and nozzle reaction are borne by the pair of orthogonally arranged pivoting conduit segments, and the forces of gravity are dealt with by means of a one-way brake. The monitor offers two degrees of freedom of movement, and permits a range of travel of +/−20 degrees in both the horizontal and vertical planes. The simplicity, compact size, ease of use, and relatively low manufacturing cost of the pivoting conduit segments has proven quite useful, and has been found to offer advantages over other means for adjusting trajectories in portable monitors.

Patent RE40441 taught that "additional ball and socket combinations could be added to the double ball and socket combinations to add additional range of motion in a pivoting connector". Over time, it has become apparent that the additional range of motion suggested by the patent would prove useful. Patents such as U.S. Pat. No. 7,644,777 show efforts to increase the range of motion by using two or more consecutive pivoting conduit segments whose axes of rotation are substantially parallel. However, the nozzle reaction force acts upon the segments in such monitors in a way that causes the a downstream conduit segment to rotate with respect to an upstream conduit segment, creating, for example, a tendency for the discharge elevation to raise upwards by itself. Some have touted this tendency as a "safety feature" (because it stops unattended fire monitors from spraying at lower elevation angles), but others recognize that there are disadvantages in requiring the firefighter to exert a separate force to maintain the relative positioning of the downstream segment.

In these portable monitors, the downstream conduit segment places the nozzle reaction forces on a plane that passes above the horizontal axis between a midstream conduit segment and an upstream conduit segment, resulting in a net torque about that axis. This vertical offset also increases the overturning moment of the monitor, tending to make the front of the monitor lift off the ground and thus decreasing the stability of the monitor. Counterbalance devices described in the patents inhibit free range of travel for unattended operation of the monitor.

U.S. Pat. No. 7,802,630 shows an attempt to increase the range of motion of a firefighting monitor by using multiple pivoting fluid conduit segments in series. This monitor uses a series of identical ball-and-socket conduit segments that are each easy and cheap to manufacture. However, operation of the monitor at angles other than straight ahead results in an ever-increasing moment from nozzle reaction, which tends to straighten the assembly. With only a single actuator, the effects of nozzle reaction and gravity (which sometimes aggregate and sometime offset each other, depending upon the position of the conduit segments) tend to make the monitor whip from side to side as even slight misalignment from a straight position causes moments on the other conduit segments. On the other hand, using an actuator on multiple conduit segments (as described in connection with the embodiment seen in FIG. 6) makes the device expensive to manufacture and difficult to use.

Some of the disadvantages of these monitors were attempted to be addressed in US patent publication 2009-0277656, which shows a series of concentric pivoting elements that have a common axis of rotation. The illustrated monitor appears to be operable by hand, and would not move by itself under the forces of nozzle reaction. However, it is not evident that the pieces can be assembled as depicted, and the concept has serious flaws: the pieces are quite complex to machine from metal (even with a 5-axis CNC machining center) and each joint requires specialized seals to be molded (each of a different size). The elevation mechanism is far more complex than those used in swivel joint monitors from the same company, such as those depicted in U.S. Pat. No. 4,674,686.

SUMMARY OF THE INVENTION

The applicants have developed a new monitor that offers an extended range of travel through the use of multiple pivoting conduit segments jointed together in series. The design overcomes the effects of forces from gravity and nozzle reaction by using a new synchronizing mechanism that confines how the conduit segments move with respect to one another.

In one embodiment of the invention, a firefighting monitor the synchronization mechanism has engaging faces that limit movement of the joints so that only one joint can move at a time. These faces allow a downstream conduit segment to pivot with respect to an intermediate conduit segment only when the intermediate conduit segment is restrained from pivoting with respect to an upstream conduit segment. When the upstream conduit segment can pivot with respect to the intermediate segment, it can do so through its entire range of travel with respect to the intermediate conduit segment while rotation of a downstream segment is inhibited with respect to the midstream conduit segment.

When the midstream conduit segment reaches an end of its stroke with respect to the upstream conduit segment, the synchronization mechanism changes mode and inhibits rotation of midstream conduit segment with respect to the upstream conduit segment. In this new mode, the synchronization mechanism frees the downstream conduit segment to rotate with respect to the midstream conduit segment through at least a part of its full range of motion. While the downstream conduit segment is moving in this mode, the nozzle reaction force is through the axis between the midstream conduit segment and the downstream conduit segment, and does not cause moment about that axis. At the same time, any nozzle reaction forces acting upon the joint between the midstream conduit segment and the upstream conduit segment are restrained by the synchronization mechanism.

In one version of this embodiment, the synchronization mechanism is arranged to enable the downstream conduit segment to rotate with respect to the midstream conduit segment at both ends of the range of motion of the midstream conduit segment with respect to an upstream conduit segment: part of the rotation of the downstream conduit segment with respect to the midstream conduit segment is allowed at one end of the range of motion of the midstream conduit segment with respect to the upstream conduit segment and the other part of the range of motion of the downstream conduit segment is allowed at the other end of the range of motion of the midstream conduit segment with respect to the upstream conduit segment. In between (i.e., while the device is operating in the first mode, with the intermediate conduit segment free to rotate with respect to the upstream conduit segment), the downstream conduit segment is locked in a midstroke position with respect to the midstream conduit segment. In the second mode of operation (i.e., while the device has been rotated to either end of the full range of motion of the midstream conduit segment with respect to the upstream conduit segment), the synchronization mechanism permits rotation of the downstream conduit segment with respect to the midstream conduit segment between its midstroke position and one of the two endpoints of its full range of motion, while simultaneously inhibiting rotation of the midstream conduit segment with respect to the upstream conduit segment. When the downstream conduit segment returns to its midstroke position with respect to the midstream conduit segment, the synchronization mechanism returns to the first mode of operation, inhibiting movement of the downstream conduit segment with respect to the midstream conduit segment while freeing the midstream conduit segment for movement throughout its entire range of motion with respect to the upstream conduit segment. When the midstream conduit segment reaches the opposite end of its full range of motion with respect to the upstream conduit segment, the downstream conduit segment is again freed for rotation with respect to the midstream conduit segment, this time from its midstroke position to the opposite end of its full range of motion.

In another version of this embodiment of the invention, the pivot axes of the conduit segments are arranged so that, when the monitor is in its lowest position, the axes between the downstream conduit segment and the midstream conduit segment and between the midstream conduit segment and the upstream conduit segment are aligned with the nozzle reaction vector, and the synchronization mechanism is arranged to enable the downstream conduit segment to move at only the upper end of the range of motion of the midstream conduit segment with respect to the upstream conduit segment. In this embodiment, the downstream conduit segment is locked in its lowermost position while the midstream conduit segment is free to move with respect to the upstream conduit segment. The downstream conduit segment becomes unlocked with respect to the midstream conduit segment and free to move (throughout its entire range of motion) only when the midstream conduit segment reaches the upper end of its full range of motion with respect to the upstream conduit segment. In this embodiment, the arrangement of the pivot axes with respect to the discharge element provides improved stability at low trajectories.

For even more range of motion, more than two joints with substantially parallel axes can be used consecutively. In monitors like these, the new synchronization mechanism may be repeated at each joint in a way that causes motion between adjacent conduit segments to be consecutively inhibited and released, allowing each conduit segment to move in turn in a prescribed sequence. Only one conduit segment moves at a time, while the others remain inhibited.

In another embodiment of the invention, synchronization mechanisms are arranged to control movement of adjacent elements so that rotation of one conduit segment with respect to a second conduit segment is automatically proportional to the rotation of that conduit segment with respect to a third conduit segment.

DETAILED DESCRIPTION

The description below will first discuss the general arrangement of monitors that use the new invention, and then the general structure and functionality of sequencing mechanisms used for limiting rotation to one joint at a time. Then, the details of a "bilateral" and a "unilateral" monitor will be discussed. Finally, a sequencing mechanism for a monitor that automatically proportions the movement of one conduit segment with respect to an adjacent conduit segment will be discussed.

General Arrangement of Monitors

Figure 1:
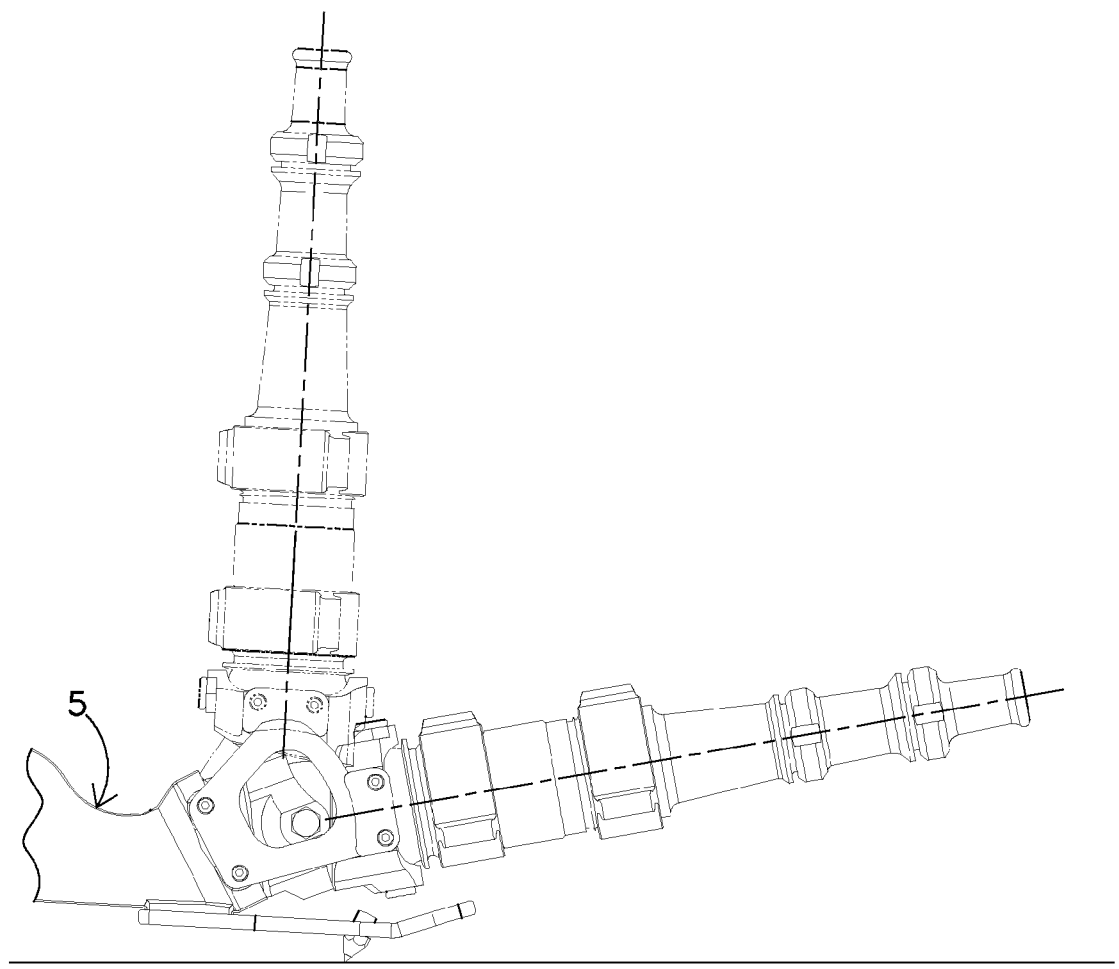
FIG. 1 is a side view of portions of one type of firefighting monitor that uses the new invention.
Figure 2:
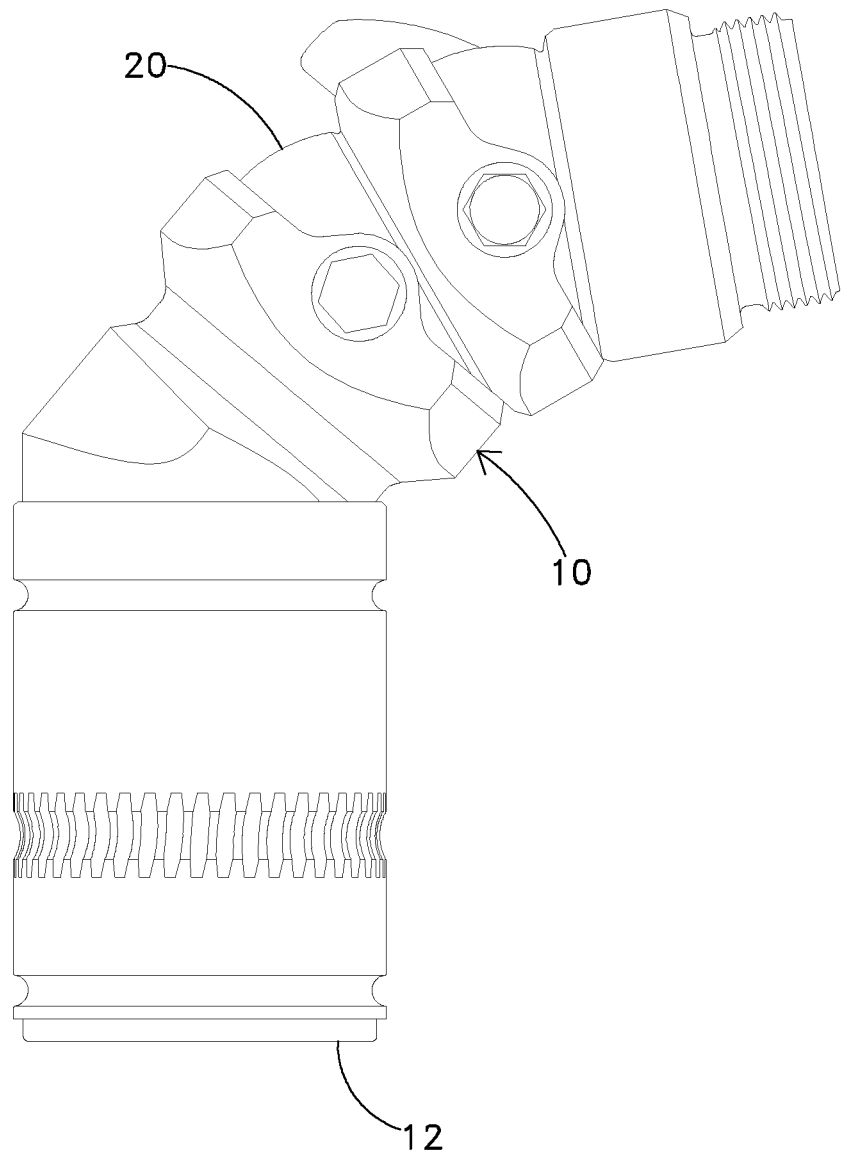
FIGS. 2-6 are perspective views of portions of another type of fire-fighting monitor that uses the new invention.
Figure 3:
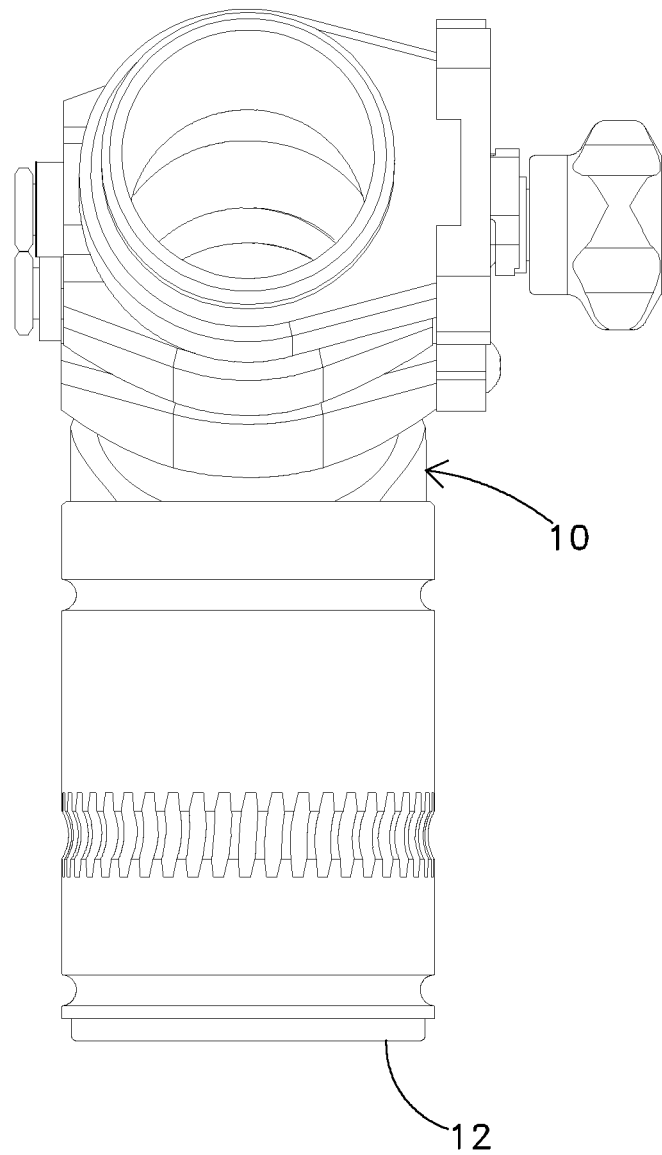
Figure 4:
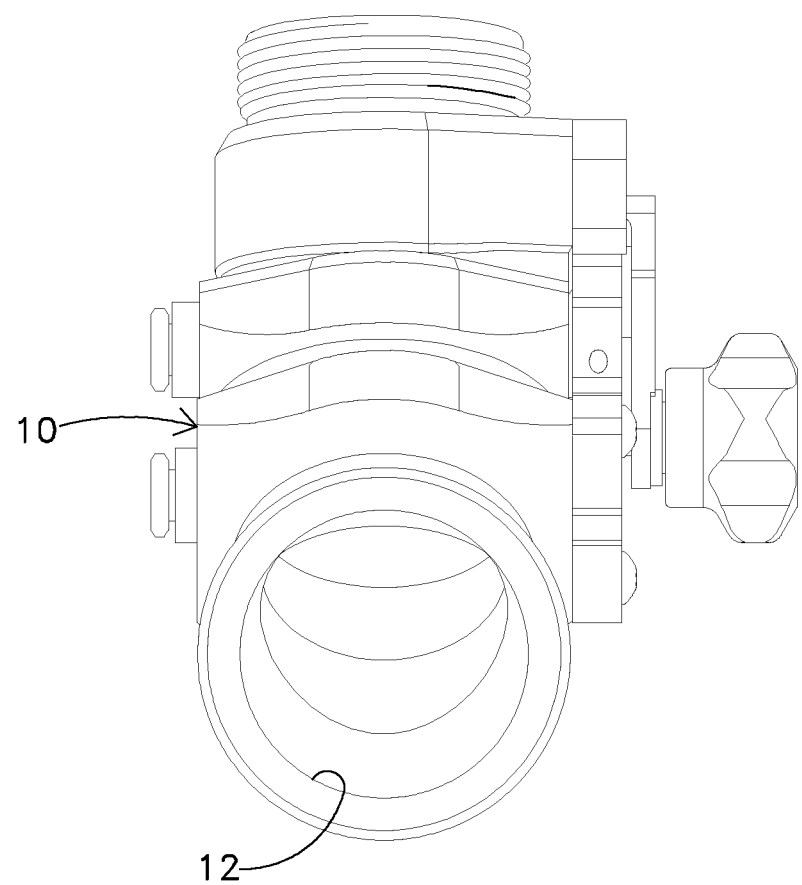
Figure 5:
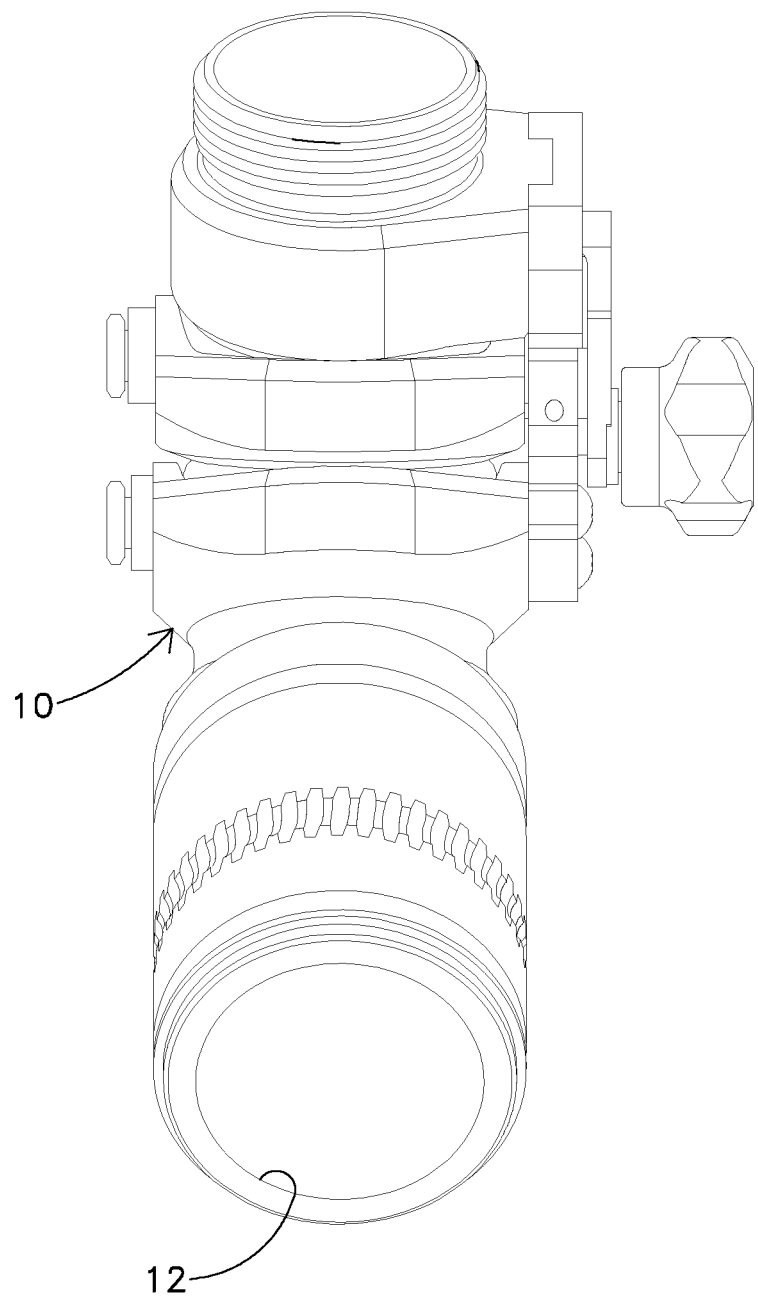
Figure 6:
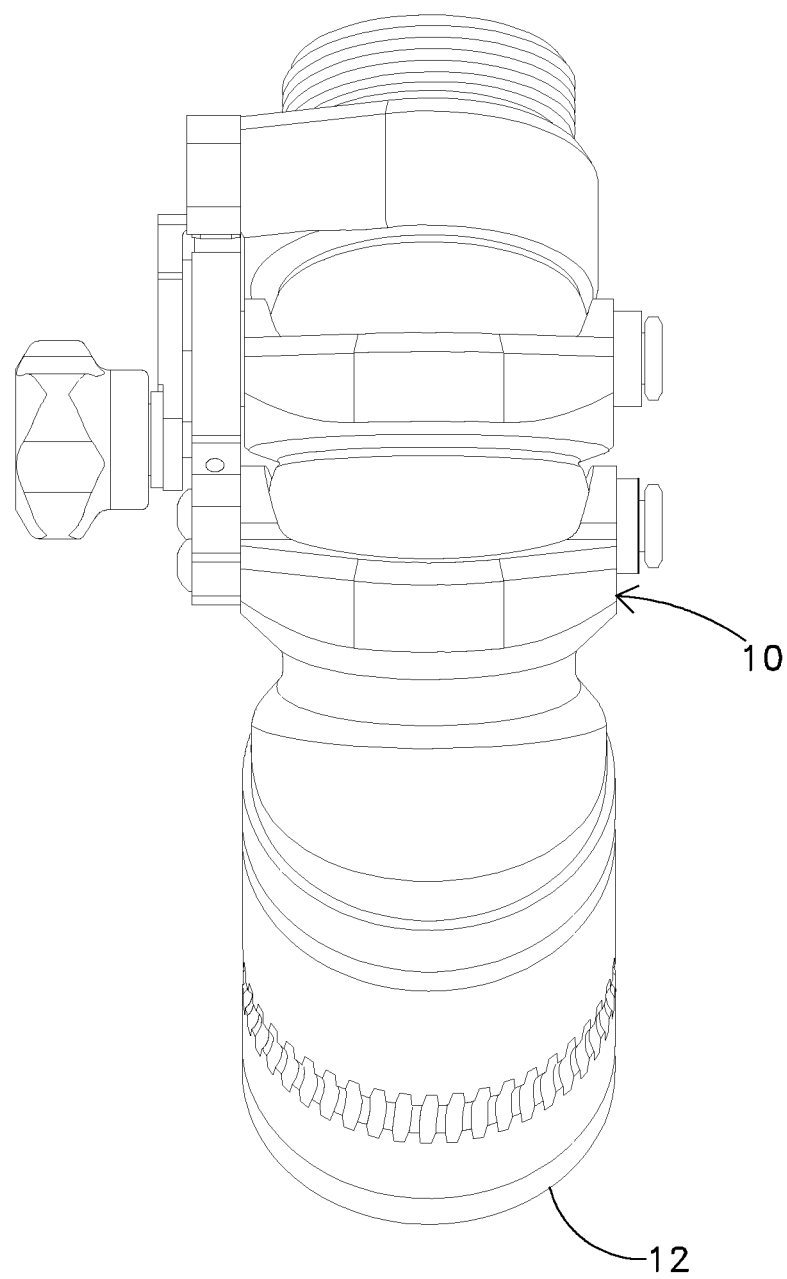

FIG. 1 illustrates the range of motion of a monitor 5 that uses one form of the new invention.

Figure 18:
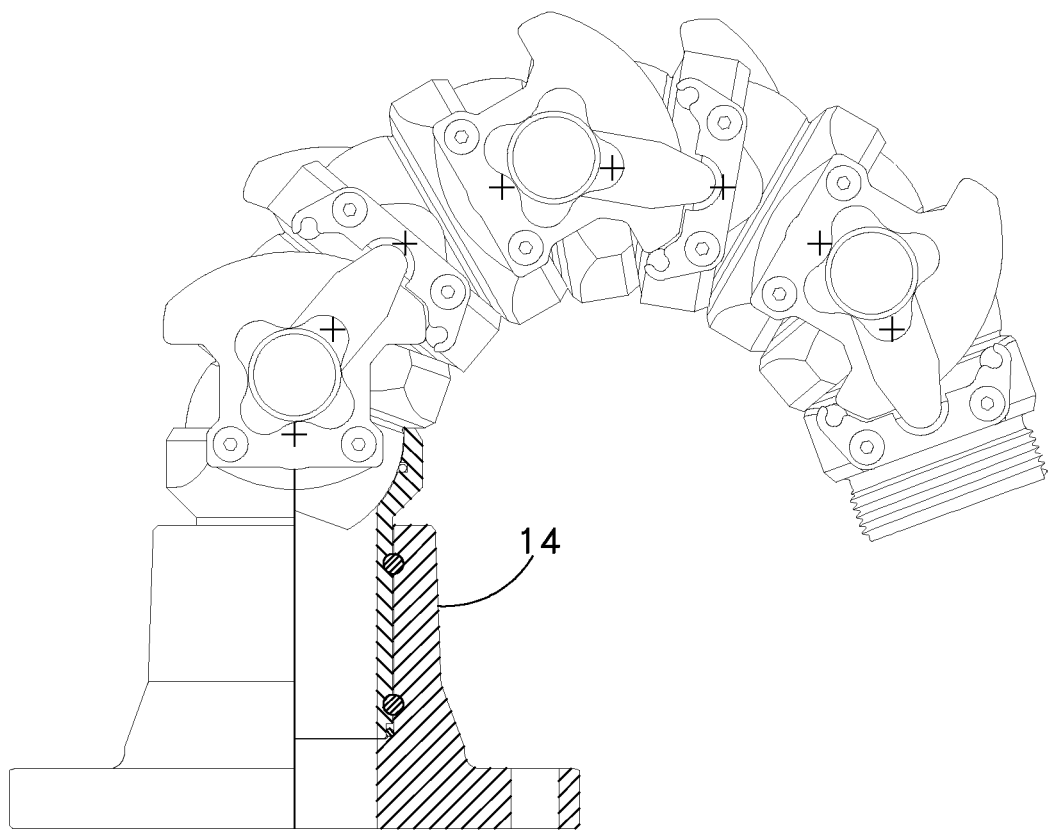

The monitor 10 illustrated in FIGS. 2-6 is a fixed monitor, and rotates about a central axis on a fluid inlet 12. The fluid inlet 12 receives fluid from a fixed base 14 as depicted in FIG. 18 which is typically fed from a pressurized fluid source and piping system. The fluid inlet 12 forms a rotary union with the fixed base in order to aim the discharge trajectory of the monitor through rotation.

Figure 7:
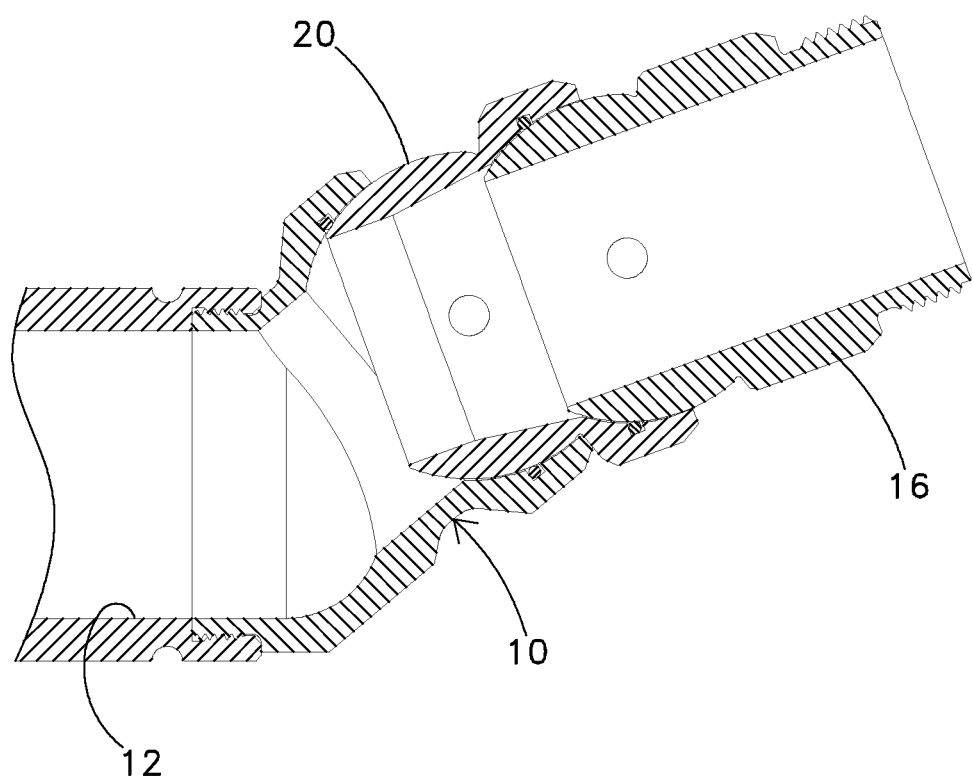
FIGS. 7-9 are cross-sectional views of a portion of the monitor.
Figure 8:
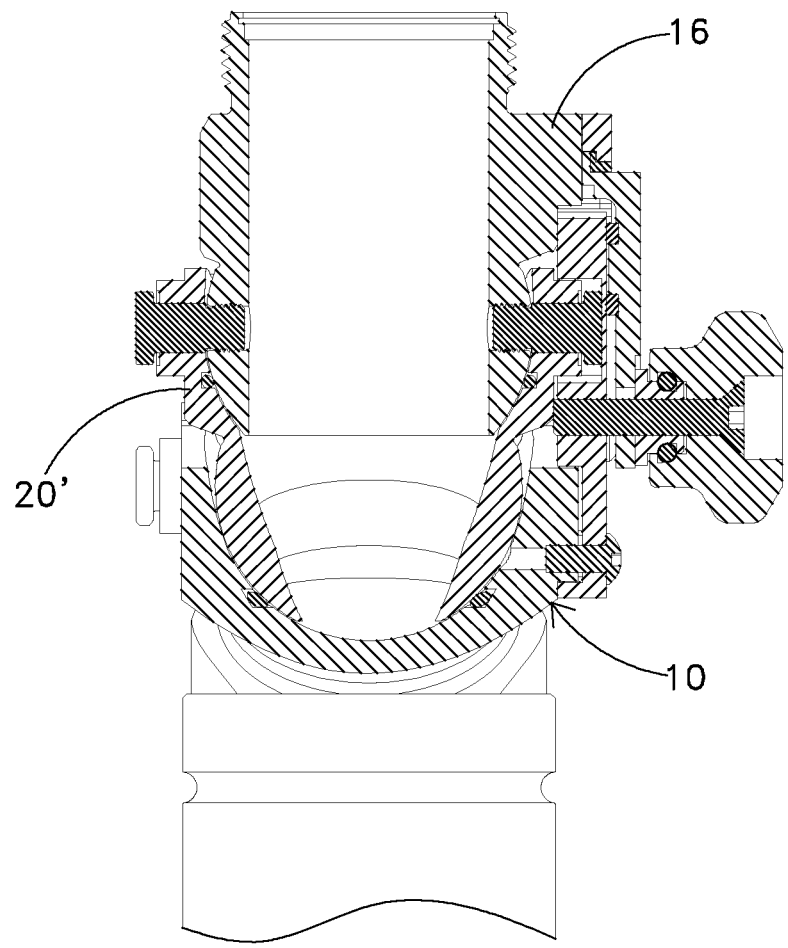
Figure 9:
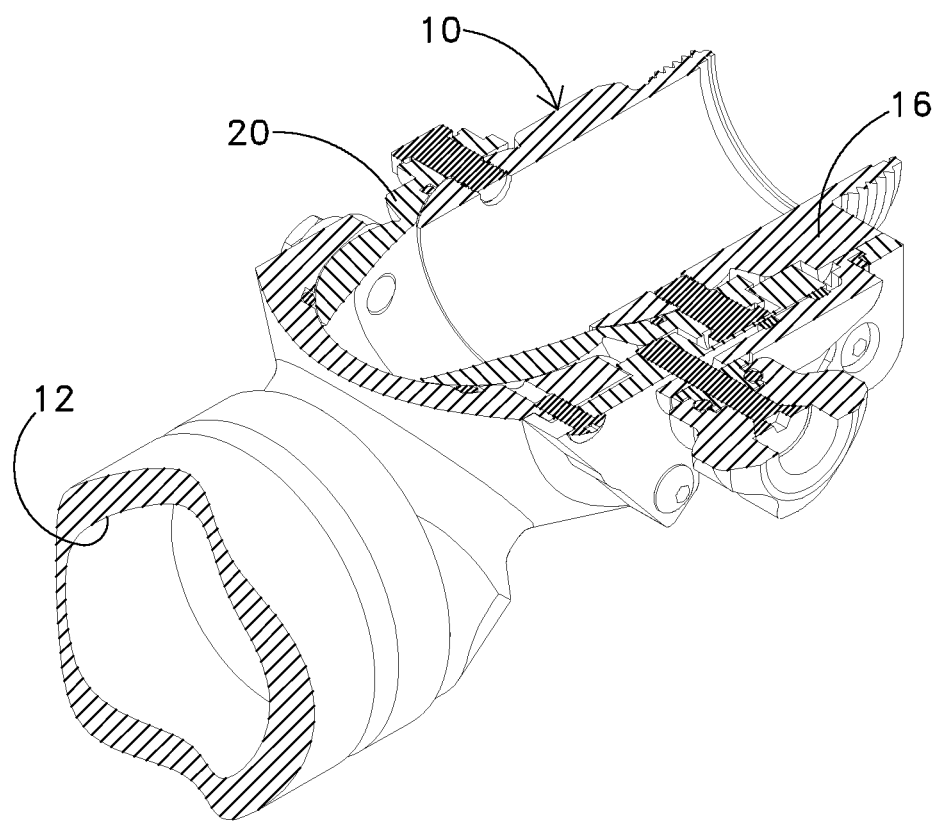
Figure 10:
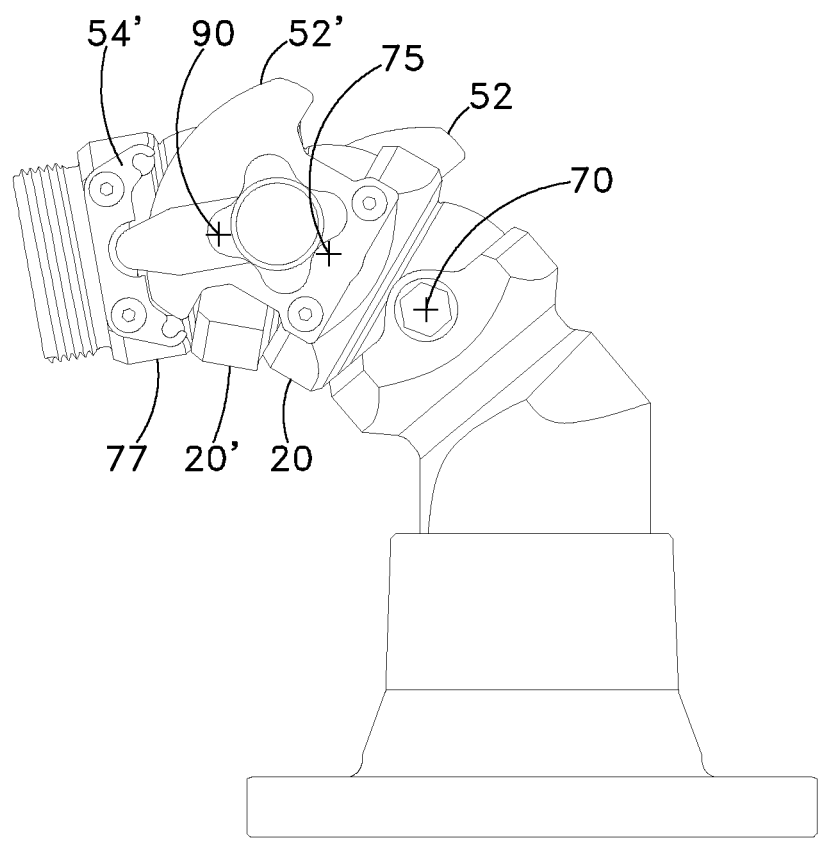
FIGS. 10-12, 13-15, 16-18, and 19-21 are views of monitors with two conduit segments in the same plane, three conduit segments in the same plane, seven conduit segments in the same plane, and five conduit segments in two different planes, each set including views of the monitor in three different positions.
Figure 11:
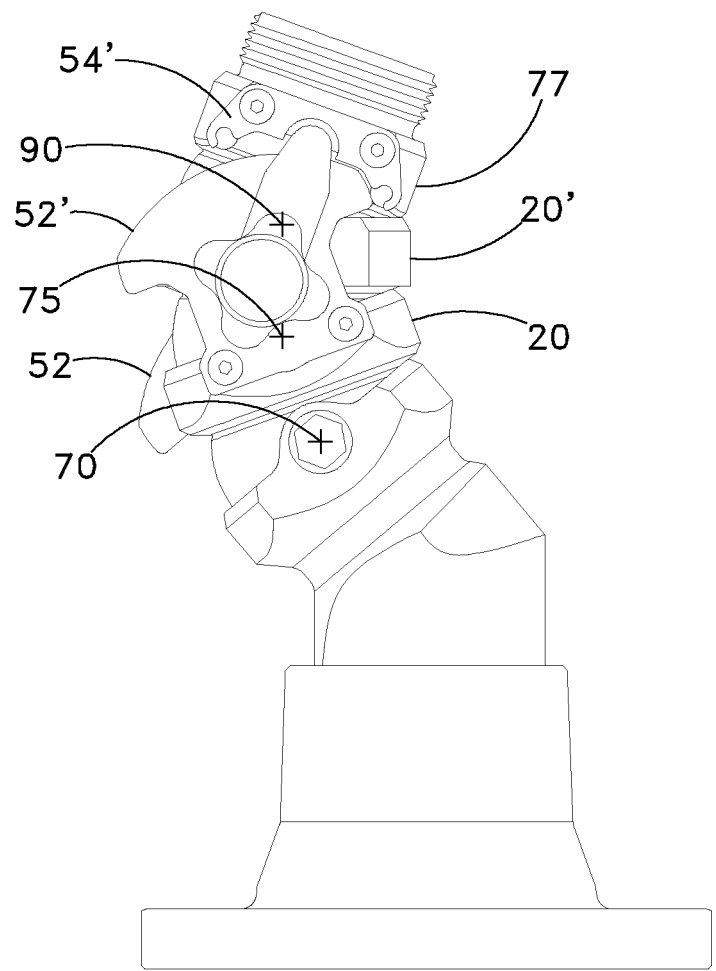
Figure 12:
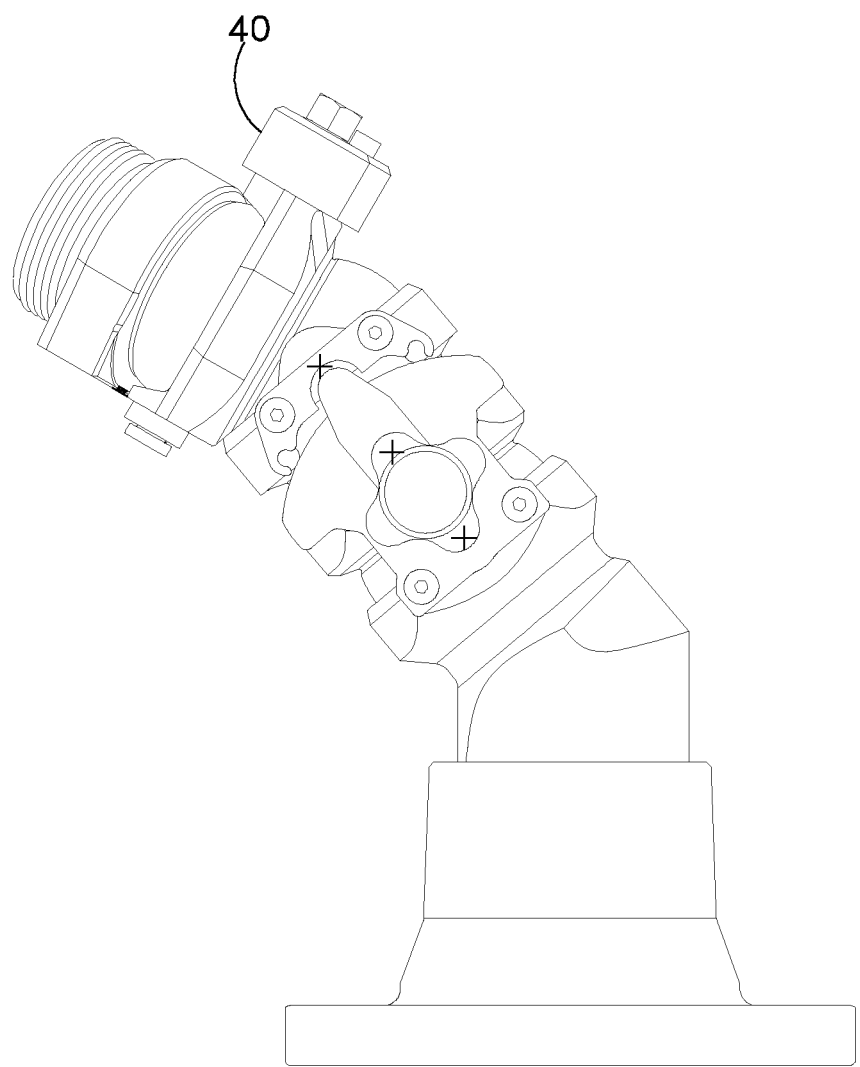
Figure 13:
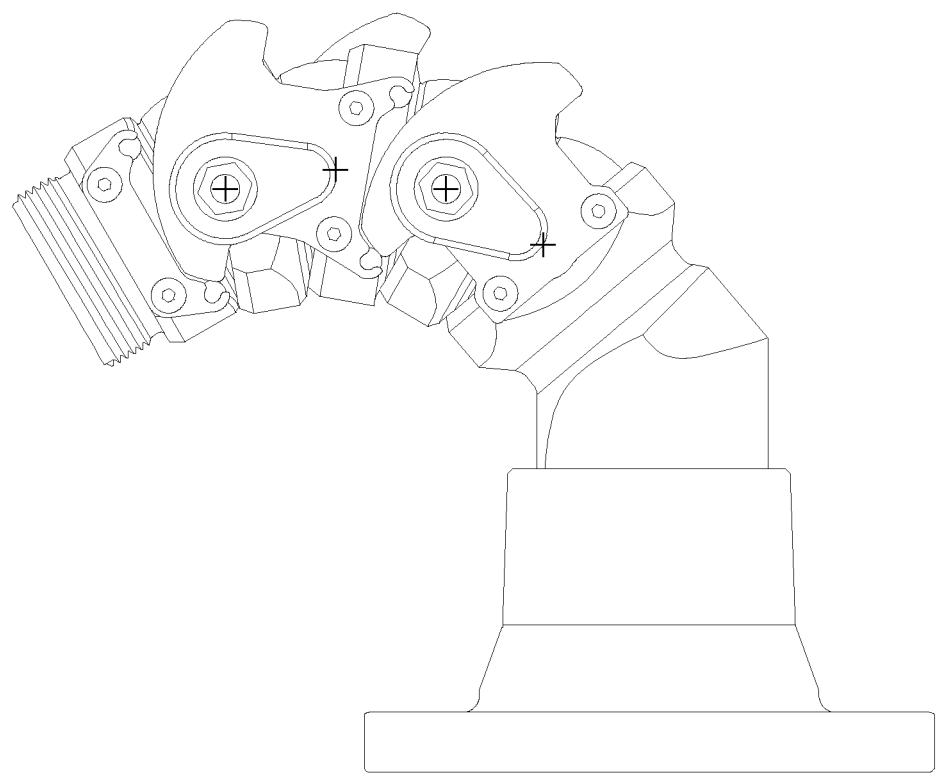
Figure 14:
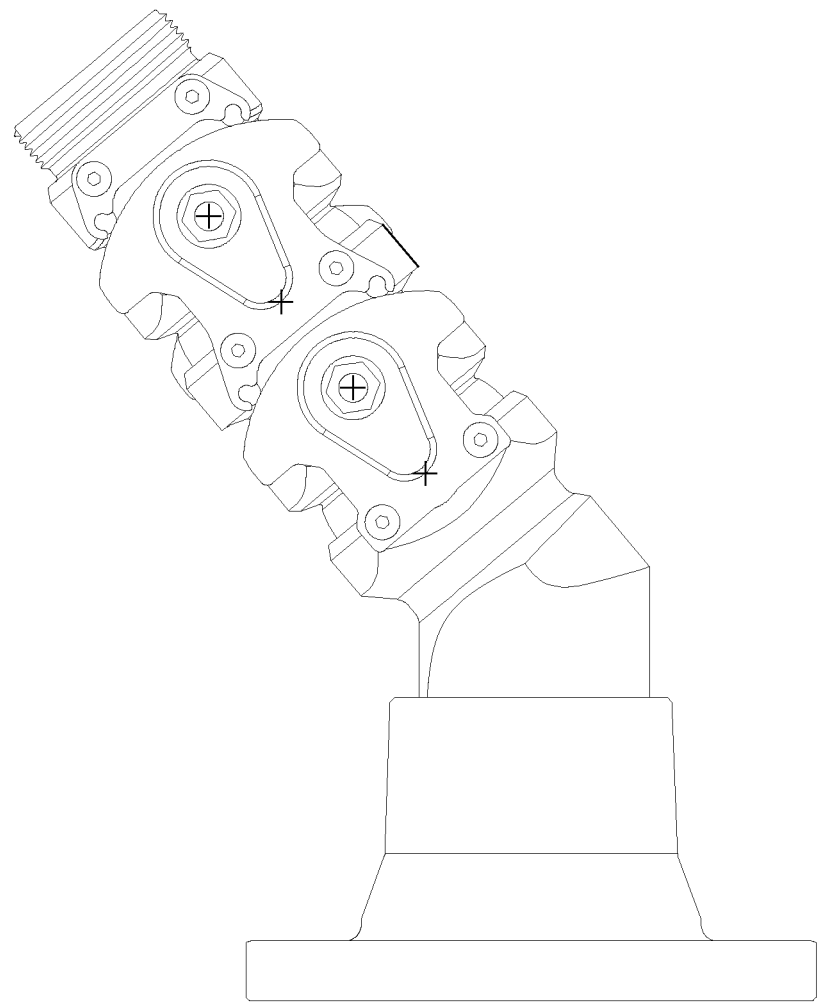
Figure 15:
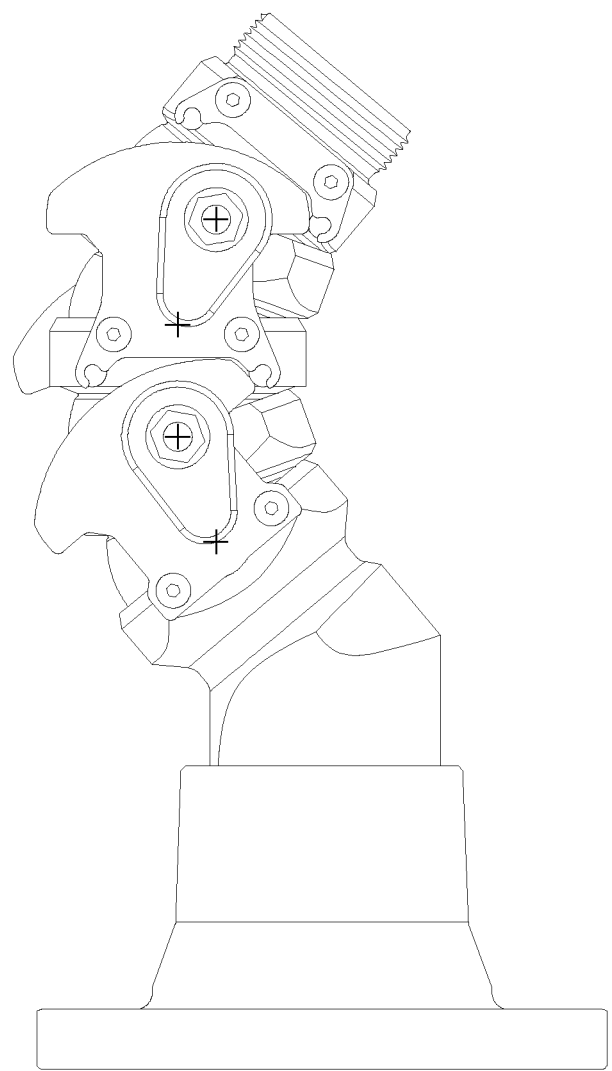
Figure 16:
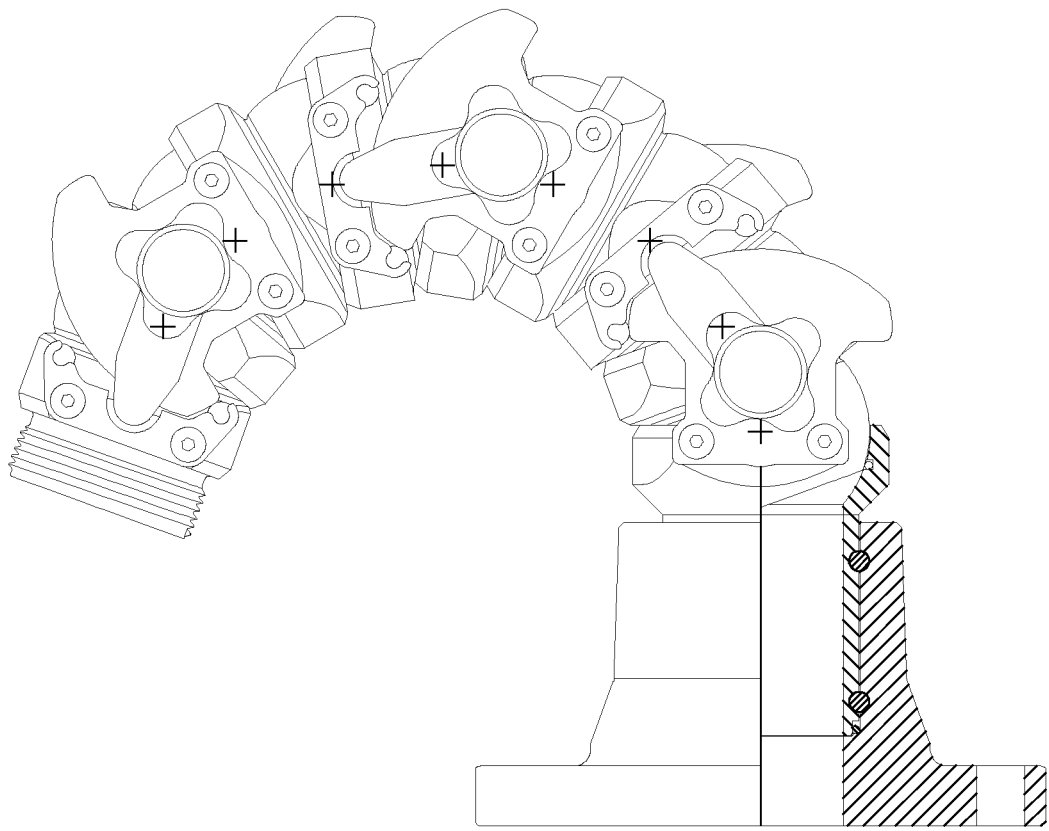
Figure 17:
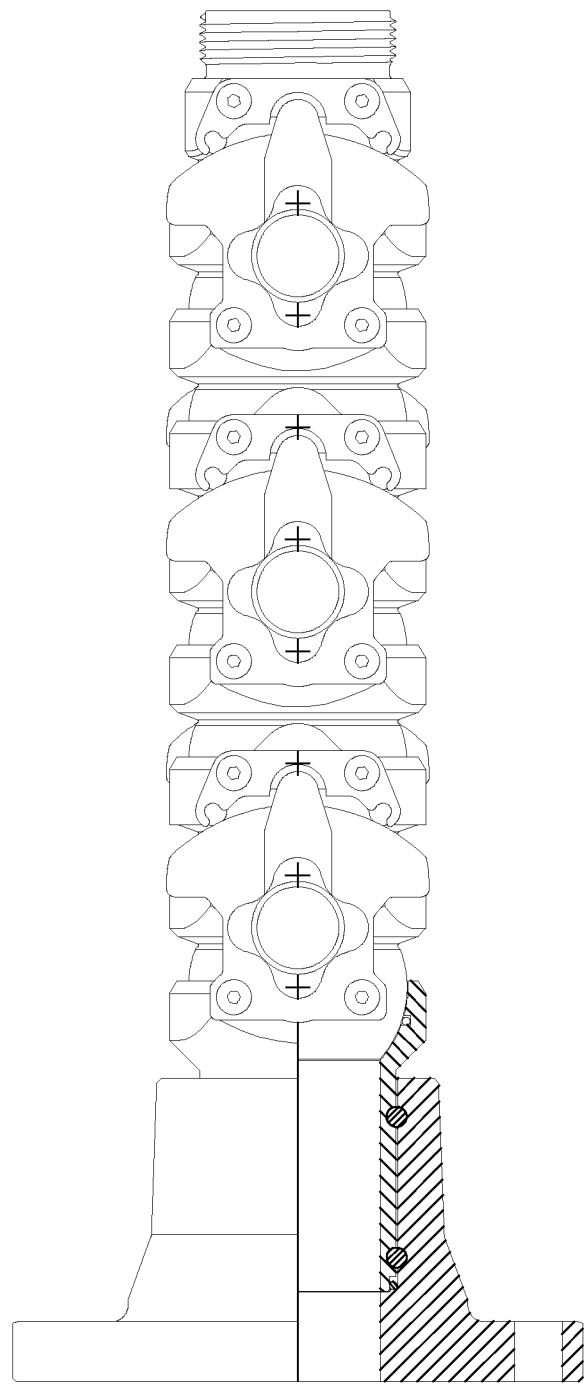

As seen in FIGS. 7-9, the illustrated monitor has a downstream fluid conduit 16, which in this example is a discharge element that is threaded to receive a variety of nozzles using a fire hose connection. The discharge element may also be connected to or integrally formed with any desired connector style, or be integrated with the nozzle inlet itself. The fluid flow exiting from fluid inlet 12 is not coaxial with the central axis of the incoming fluid flow.

Upstream of the downstream conduit segment 16 is a midstream conduit segment 20. While this monitor 10 has one conduit segment between the inlet 12 (which, in this example, serves as an upstream conduit segment) and the downstream conduit segment 16, multiple conduit segments can also be used, as seen in FIGS. 10-21. The general construction and operation of such conduit segments is described in US reissue patent RE40441, which is incorporated herein by reference. While the drawings and description here depict the socket portion of the conduit segments upstream of the ball portion of the conduit segments, that relationship could be reversed if desired. Likewise, moving elements shown with one ball and one socket on opposite ends could alternately be configured as double male, or double female elements. The waterway through each conduit segment can have a variety of configurations, including straight, curved, or formed in a non-circular cross section or as a series of cylindrical sections.

Each illustrated conduit segment adds about another plus and minus 20 degrees of travel to the downstream conduit segment/discharge element 16, depending on the ratio of ball diameter to waterway diameter. Two of these conduit segments arranged in series with parallel axes give a total range of travel of 80 degrees. Three of these conduit segments give a range of 120 degrees, and four of these conduit segments give a range of 160 degrees.

Figure 19:
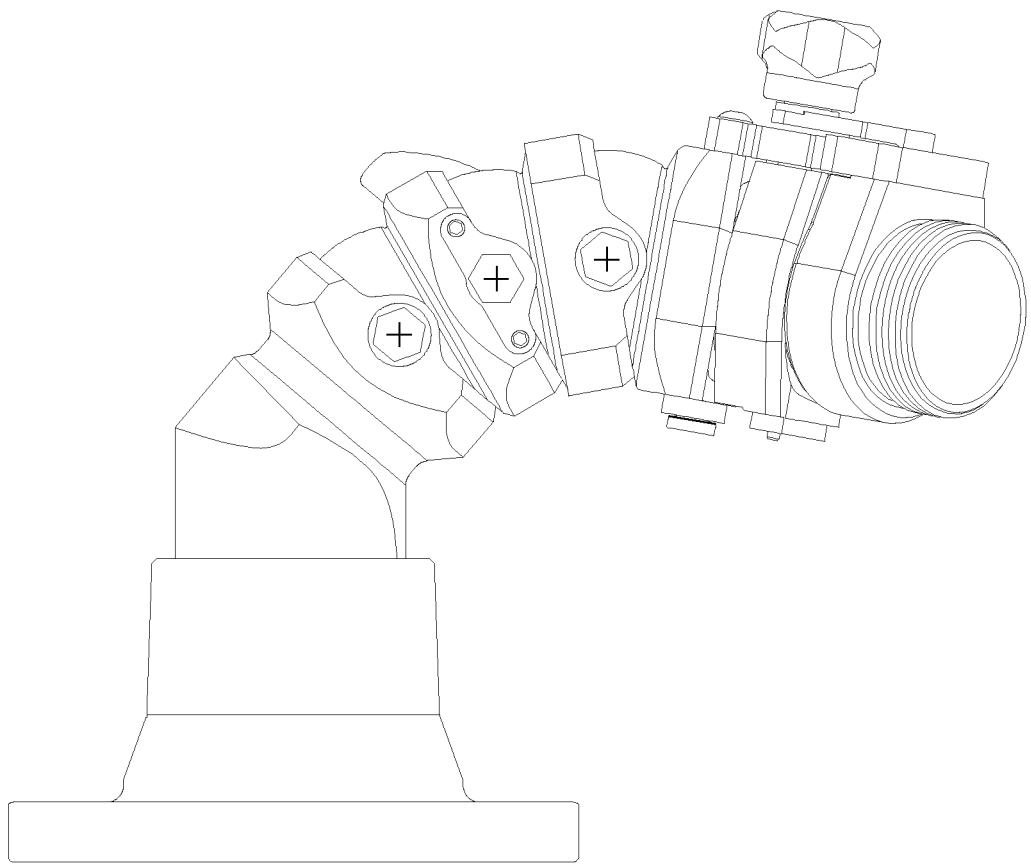
Figure 20:
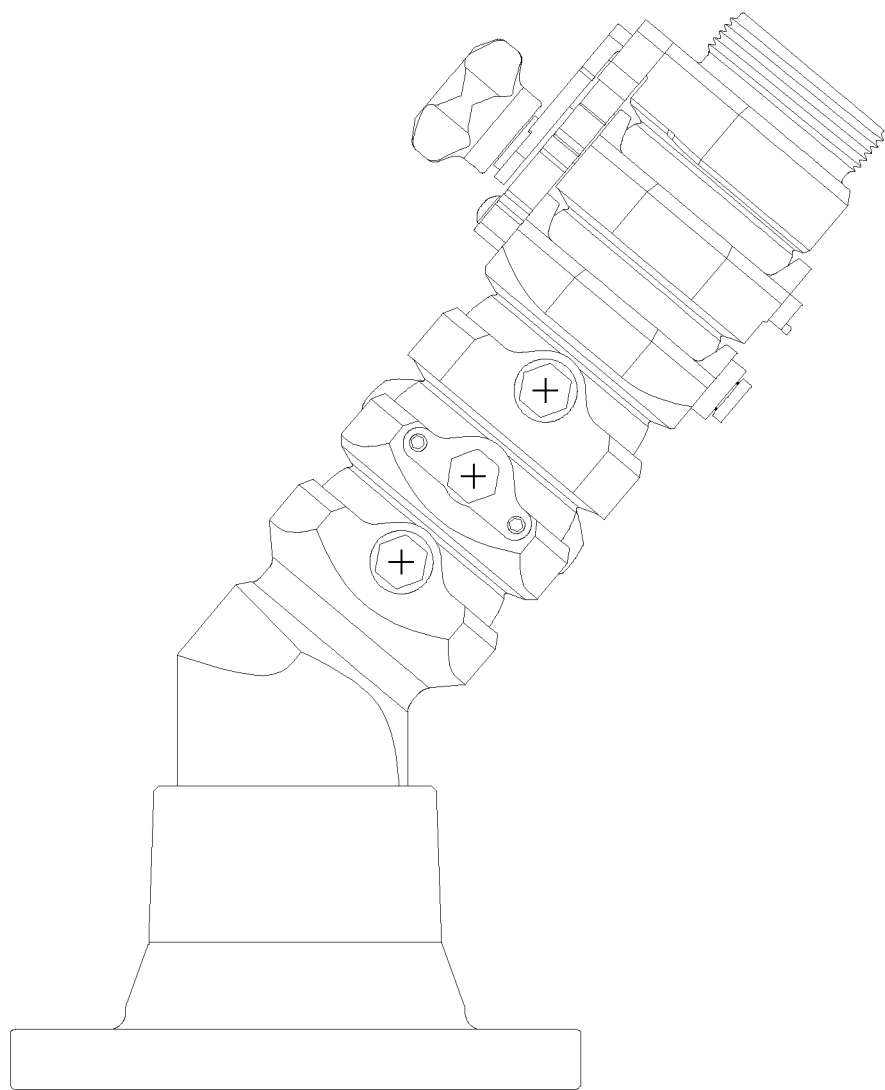
Figure 21:
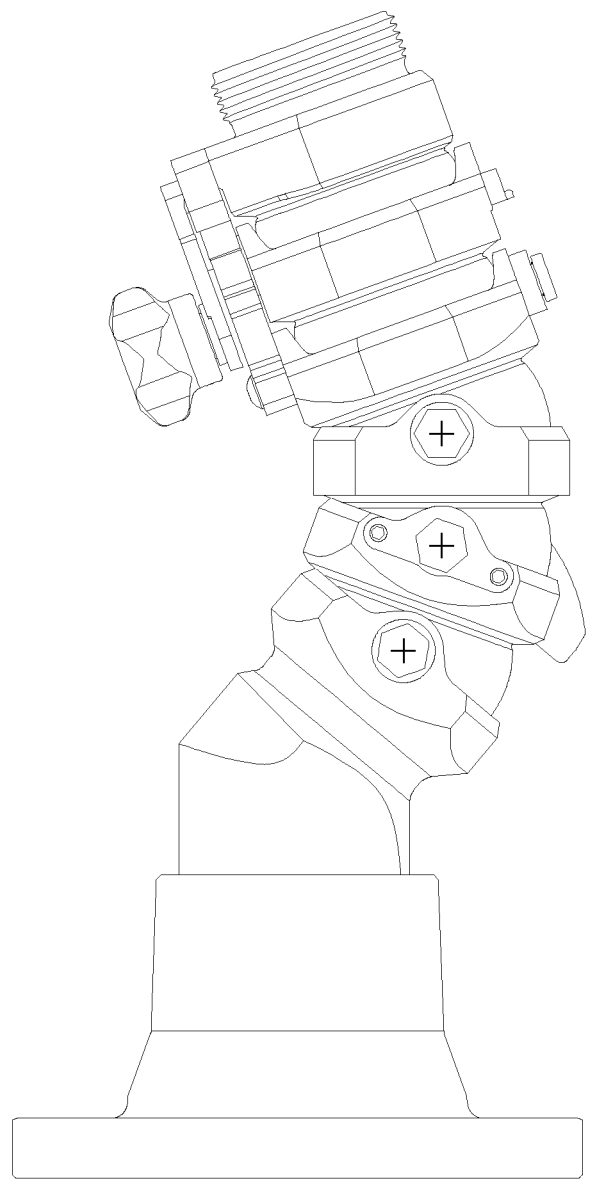

Consecutive conduit segments with axes perpendicular to the first range of motion can be used to provide a range of travel (degree of freedom) in a second plane, as in the example provided in FIGS. 19-21. In this example, the monitor has two series of ball-and-socket conduit segments, one series with one set of parallel axes and the other series with another set of parallel axes that are perpendicular to the first set of parallel axes. The first series of conduit segments pivots in one plane, and the second series of conduit segments pivots in a perpendicular plane, enabling a firefighter to use the monitor through not only a wide range of trajectories, but also in a wide range of horizontal directions.

Figure 22:
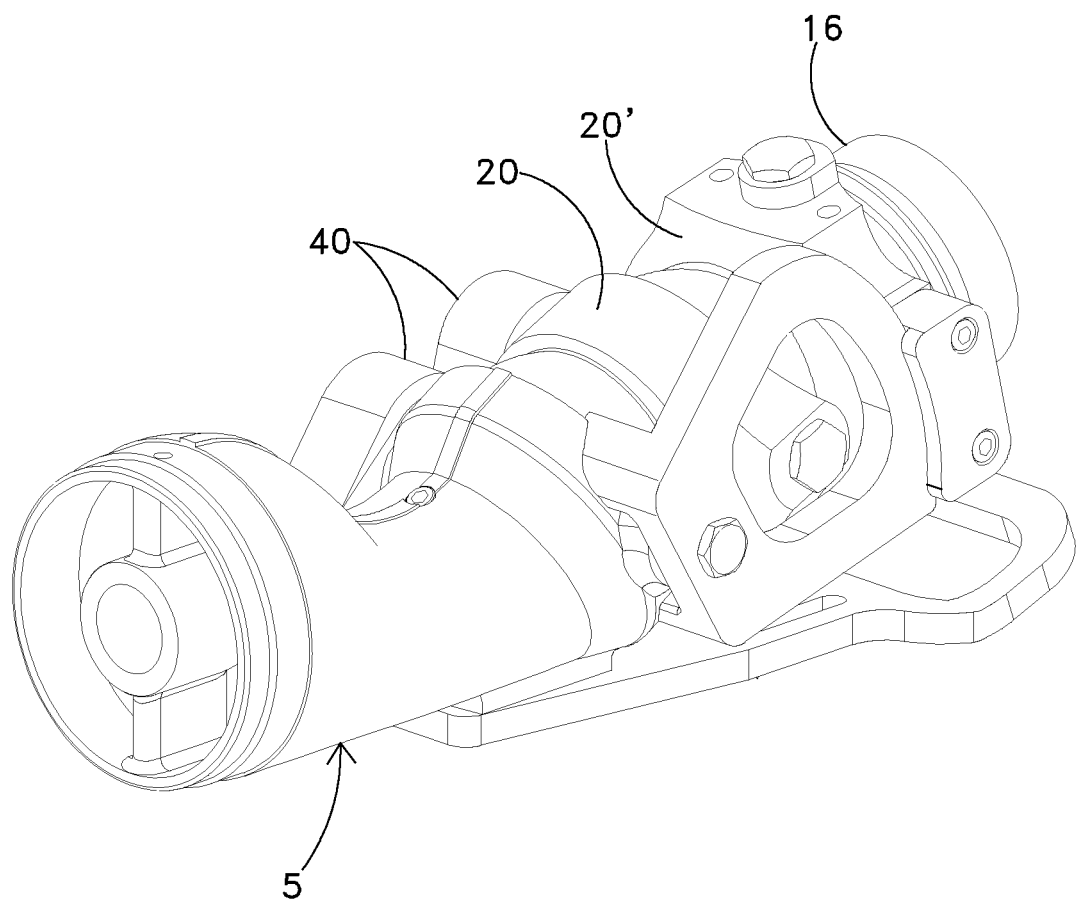
FIGS. 22-27 are perspective views of portions of the monitor seen in FIG. 1.
Figure 23:
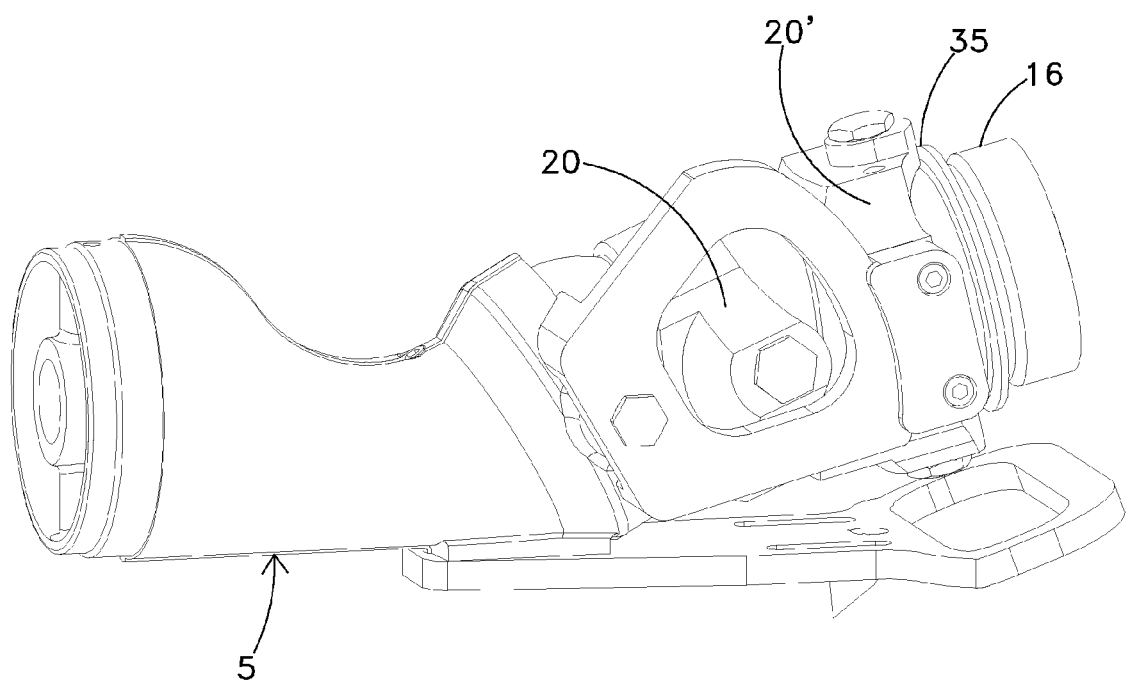
Figure 24:
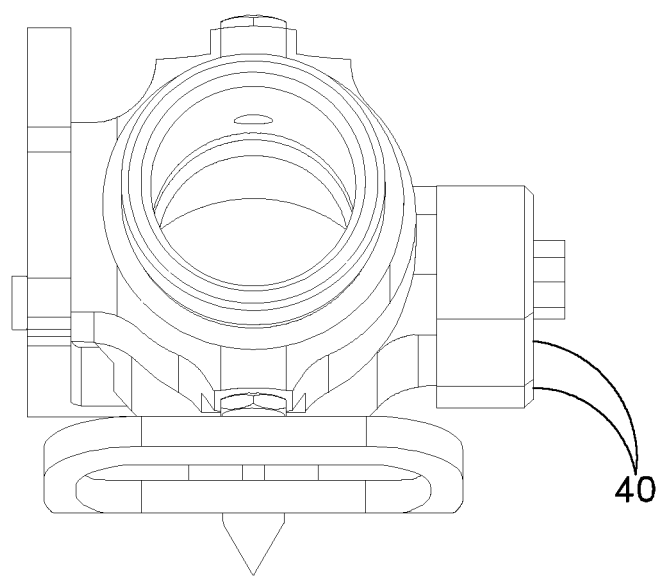
Figure 25:
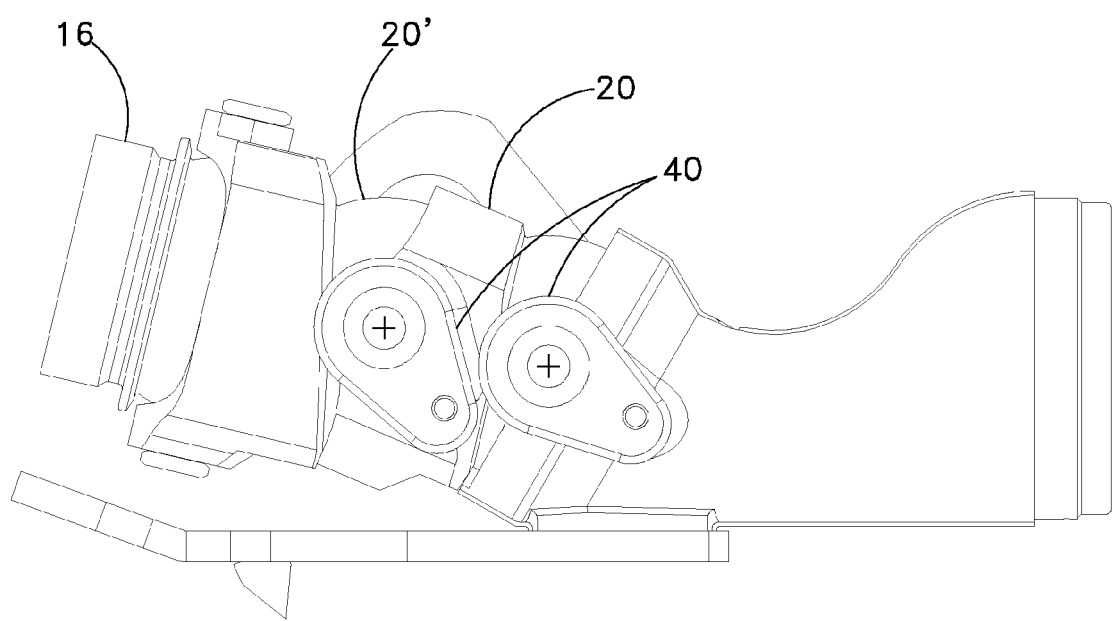
Figure 26:
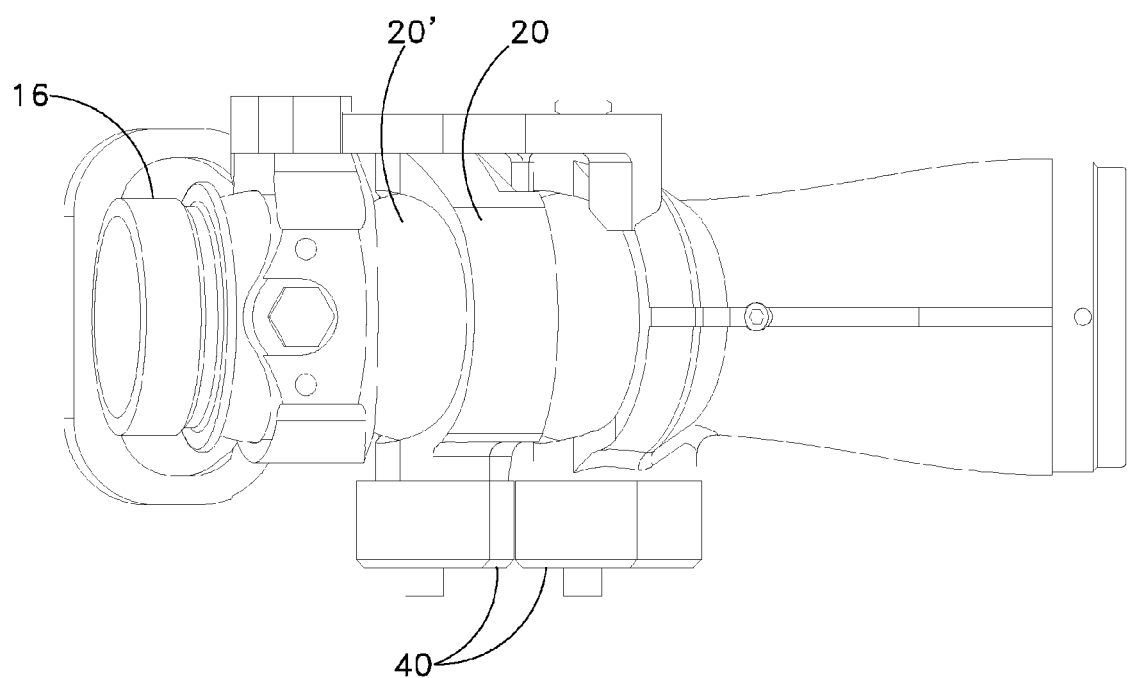
Figure 27:
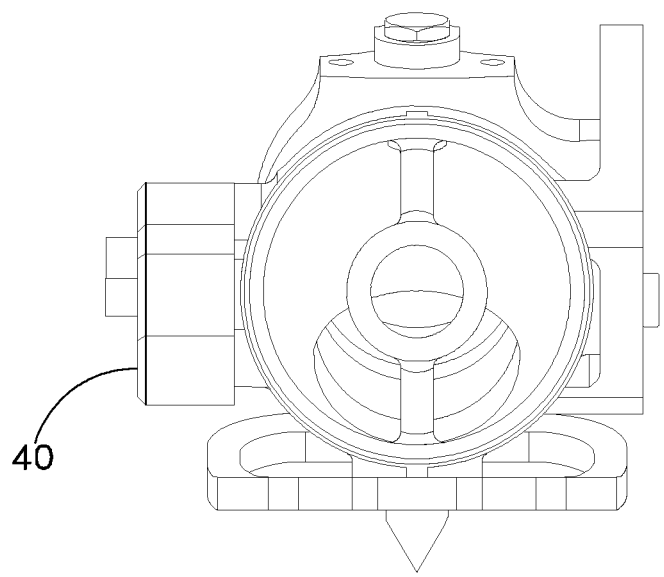

A monitor intended for portable use on a hose line, such as the monitor 5 seen in FIGS. 1, 22, and 23, can be provided not only with a conduit segment 20 on a horizontal axis that enables the firefighter to control the discharge trajectory in a vertical plane, but also a conduit segment 35 that operates in a different plane of motion that enables a firefighter to provide a side-to-side sweeping discharge.

Conduit segments 20 that are generally positioned vertically (i.e., with horizontal rotational axes) can be provided with a one-way ratcheting brake 40, such as the one seen in FIGS. 24-27, to counteract the downward effects of gravity and hold the outlet at a constant angle against the weight of the monitor, water, and nozzle. A slip clutch in the brake holds the conduit segment in place unless pushed downward, and ratchet teeth can be released to move the conduit segment upward, thereby enabling unimpeded freedom of motion in the vertical plane.

In monitors with a predetermined mounting orientation with respect to gravity, the one-way brake 40 is effective against the force of gravity. In monitors that are intended for mounting in a variety of orientations, however, the direction in which the force of gravity will act is not always known, and a one-way ratcheting brake may not be enough to counteract the force of gravity. These types of monitors may be fitted with a mechanism that resists the force of gravity in all mounting conditions. Such mechanisms can include structures that secure the joint position, such as a locking knob, clamp, or friction slip clutch. Conversely, the conduit segments might be fitted with an adjusting mechanism that provides a mechanical advantage, such as a worm/worm wheel, lever, rack & pinion, screw, cables, chains, push/pull rods, or a telescopic actuator.

In the monitor seen in FIGS. 22-27, the synchronization mechanism is fitted on one side of the monitor, and the ratcheting brakes 40, seen in FIGS. 24-27, are fitted on the opposite side. Other arrangements are possible, including arrangements with synchronization mechanisms on both sides, arrangements in which brakes and synchronization mechanisms are both fitted on the same side, and in which some conduit segments do not have a synchronization mechanism, do not have a brake, or do not have either a synchronization mechanism or a brake.

Preferably, portable monitors include a safety device that reduces or shuts off water flow in response to unexpected monitor acceleration or movement. They can also include a conventional valve that enables a firefighter to control the flow of fluid at the monitor, enabling him or her to more quickly change a nozzle, hose, or dividing valve, as needed.

Figure 28:
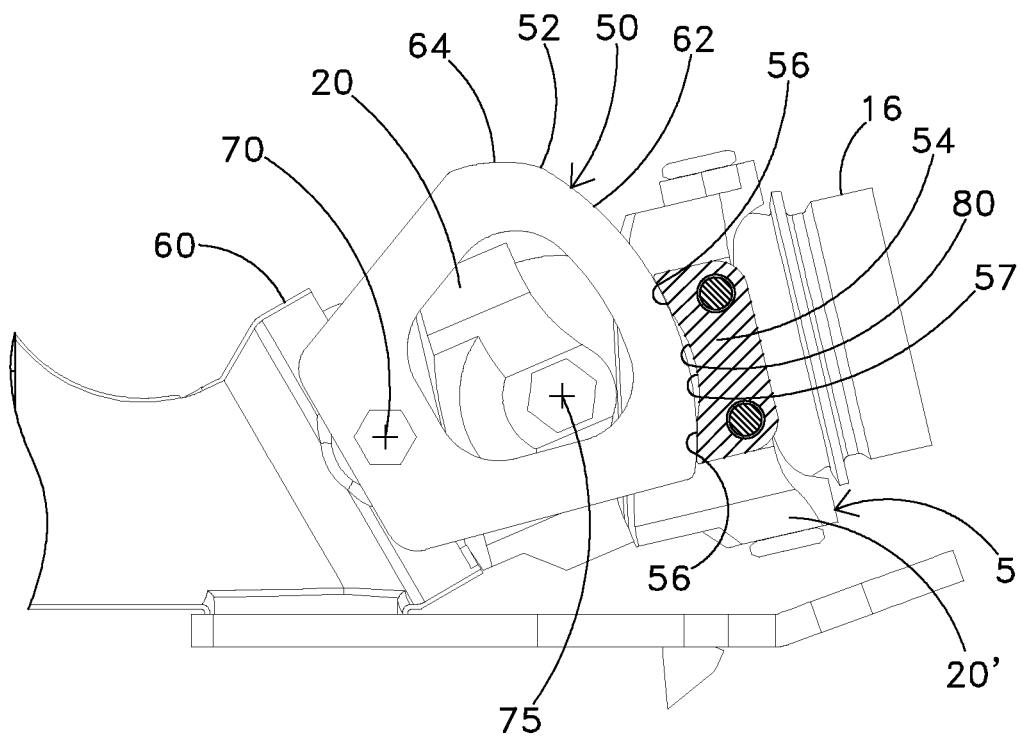
FIGS. 28-30 are side views of the monitor seen in FIGS. 22-27 in different positions.
Figure 29:
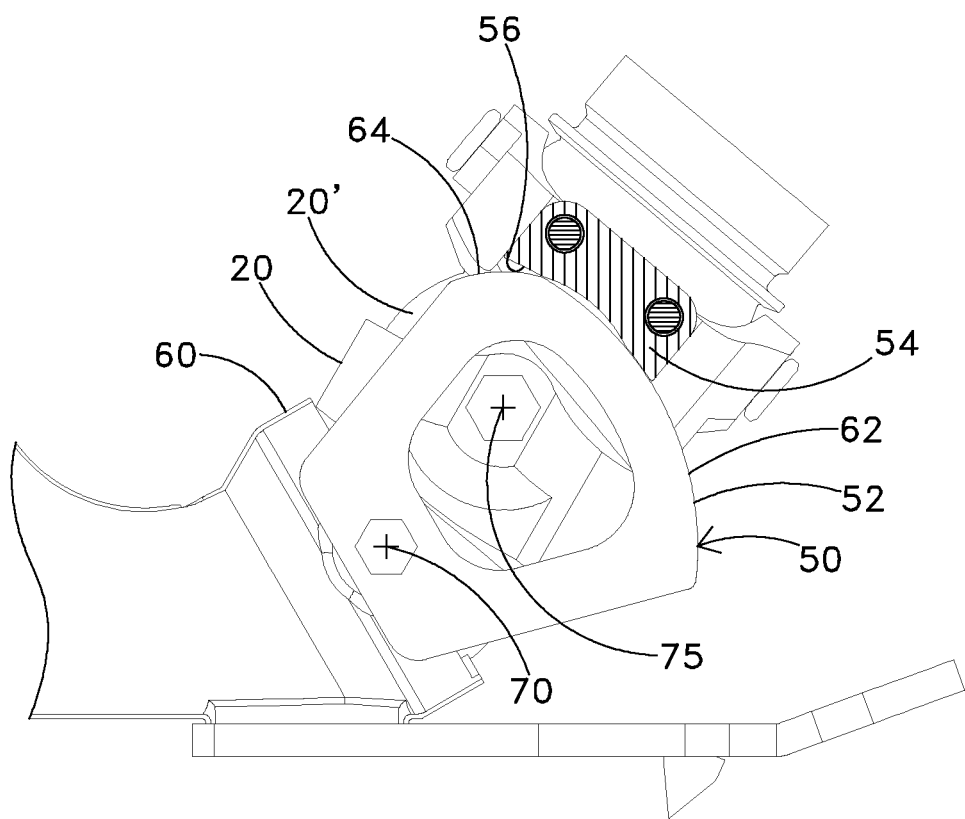
Figure 30:
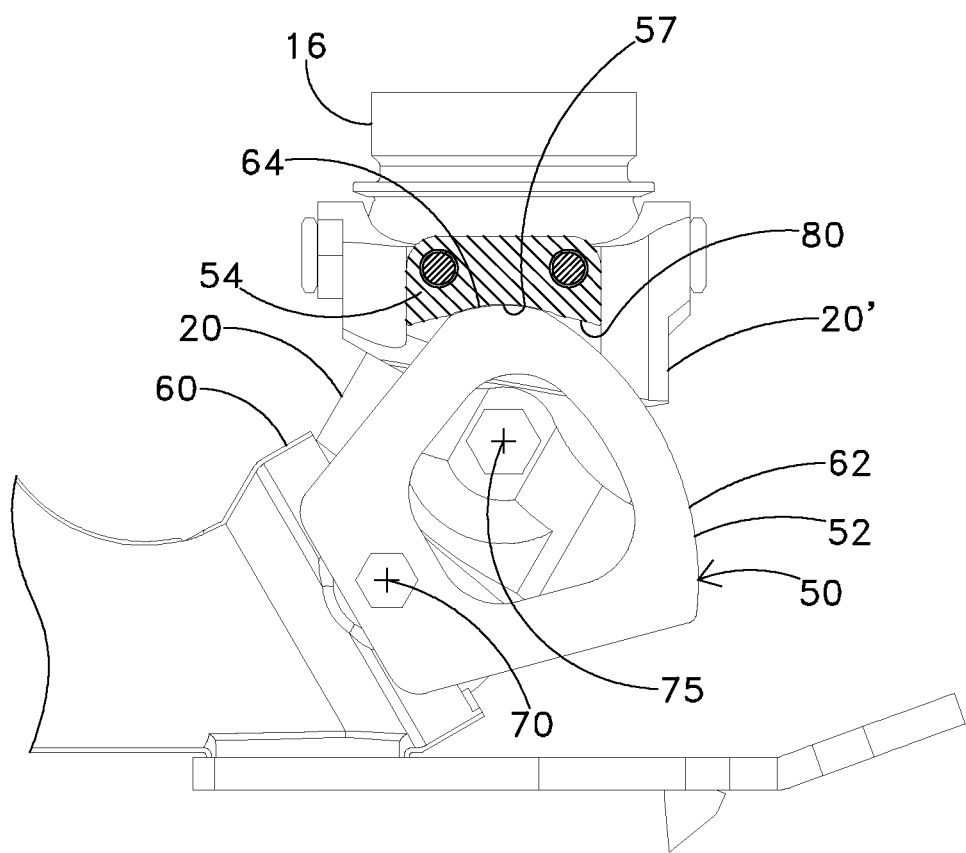
Figure 31:
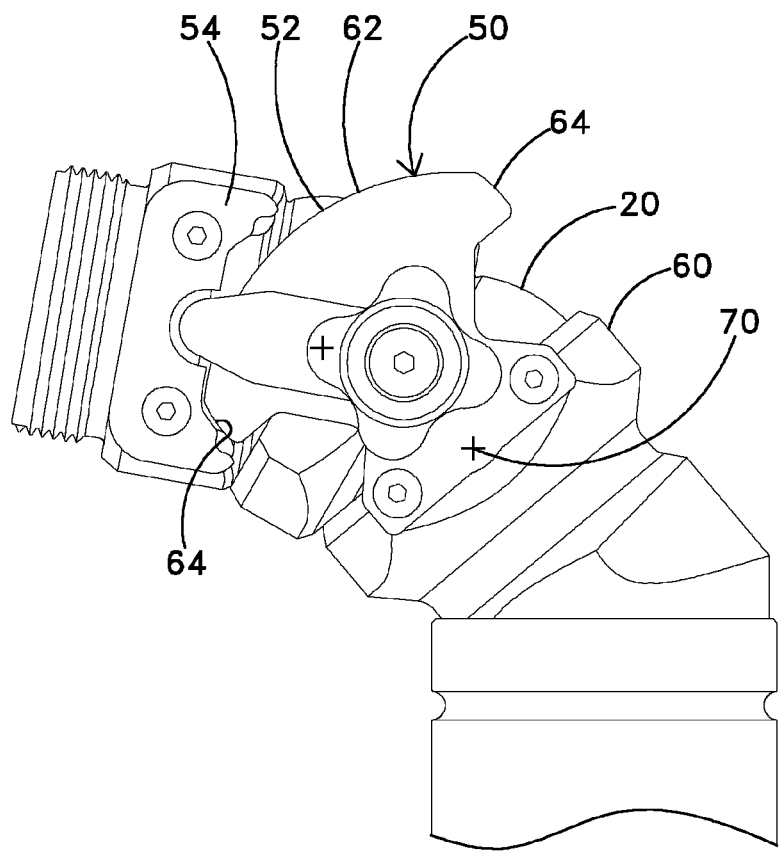
FIGS. 31-34 are side views of the monitor seen in FIGS. 2-6 in different positions.
Figure 32:
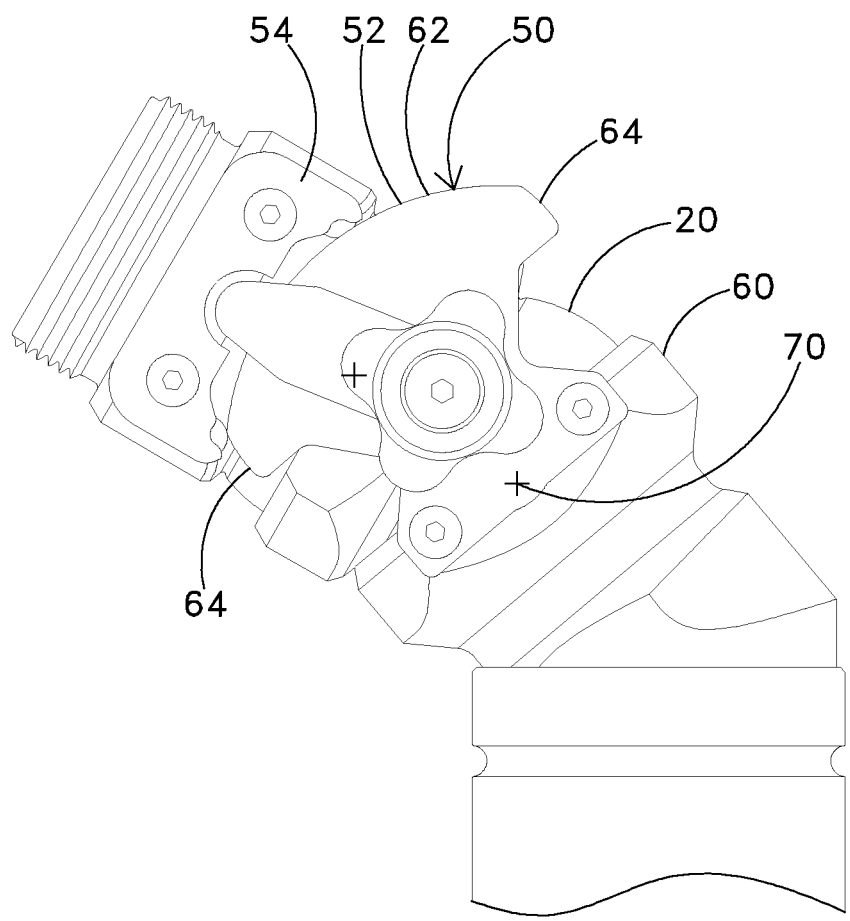

General Structure and Functionality of a Sequencing Mechanism that Limits Rotation to One Conduit Segment at a Time The monitor 5 seen in FIGS. 28-30 is fitted on at least one side with a synchronization mechanism 50 that allows only one conduit segment to move at a time. Synchronized conduit segments do not have a tendency to become kinked out of phase or whip. The preferred synchronization mechanism 50 has two parts, a two-part cam surface 52 and a follower 54.

The cam surface 52 is fixed with respect to an upstream conduit segment unit 60 about which the midstream conduit segment 20 rotates, and has both a primary cam surface 62 and, on at least one end, a more-steeply curved secondary surface 64. (In the bilateral arrangement seen in FIGS. 31-34, the cam surface has secondary surfaces at each end of the primary cam surface; in the unilateral arrangement seen in FIGS. 28-30, the cam surface has a secondary surface on only one end of the primary cam surface.) The primary cam surface in the monitor seen in FIGS. 28-30 has a primary radius that is centered on a first axis 70 where the midstream conduit segment 20 rotates about the upstream conduit segment. The secondary surface 64 has a secondary radius that is centered on a second axis 75 where the downstream conduit segment/ discharge element 16 rotates about the midstream conduit segment when the midstream conduit segment is in its raised position (as in FIG. 30).

In this example, the follower 54 is a continuous surface formed on an element that is fixed on the discharge element 16 (in multi-joint arrangements, it would be mounted on the joint downstream of midstream joint 20), in a position where a tracking surface 80 on the follower closely follows the primary cam surface 62 as the midstream conduit segment 20 rotates about the first axis 70. As illustrated here, the tracking surface has two primary contact surfaces 56 separated by a relief section 57. Other arrangements are possible. For example, in other settings, the follower might take the form of two spaced rollers, each providing one of the required contact surfaces for follower.

In a first mode of operation (seen in FIG. 28), the two contact surfaces of the follower 54 surface track enough of the cam surface to inhibit rotation of the midstream conduit segment 20 with respect to the next downstream conduit segment (in this case, discharge element 16) while the midstream conduit segment is free to move with respect to the previous conduit segment (in this case, the upstream conduit segment 60). An inhibited conduit segment cannot substantially pivot, which is to say it cannot move beyond the extent of the shake and give between the moving members.

When the midstream conduit segment 20 is rotated to the end of its range of travel with respect to the upstream conduit segment 60, as seen in FIG. 29, the mode changes. The leading of the two contact surfaces 56 on the tracking surface 80 on the follower 54 departs from the primary cam surface 62 at the inflection point between the primary cam surface and the secondary surface 64. In the new mode, seen in FIG. 30, the steeper curve of the secondary surface frees the leading contact surface of the tracking surface to begin to move closer toward the first axis 70, generally following and not necessarily touching the secondary surface 64 of the cam surface 52 and enabling the next conduit segment (in this case, the discharge element 16) to begin to rotate with respect to the prior conduit segment. As the tracking surface follows the secondary surface, interference between the secondary surface and the tracking surface limits rotation of the midstream conduit segment with respect to the upstream conduit segment, effectively locking the midstream conduit segment in position with respect to the upstream conduit segment while the next conduit segment (here, the discharge element 16) rotates with respect to the midstream conduit segment.

Thus, in the first mode of operation, when the midstream conduit segment 20 can rotate with respect to the upstream conduit segment 60, the downstream conduit segment (discharge element 16) is locked in position with respect to the midstream conduit segment. In the second mode of operation, when the next downstream conduit segment is freed for rotation, the midstream conduit segment becomes effectively locked in place with respect to the upstream conduit segment. Thus, rotation is limited to one axis at a time, and the desired synchronization of rotation of the conduit segments is achieved.

If the tracking surface 80 remains in contact with the secondary surface 64 in the second mode, then all movement of the midstream conduit segment with respect to the upstream conduit segment/base unit 60 may be inhibited in that second mode. Alternatively, play can be designed into the fit between the secondary surface and the tracking surface, while still providing significant limits on the rotation of the midstream conduit segment with respect to the upstream conduit segment/base unit.

When multiple conduit segments are used, their motion can be sequenced by using more than one synchronization mechanism. Specifically, cam surfaces and followers on subsequent conduit segments can provide the same type of synchronization. The arrangement seen in FIGS. 10-11, for example, adds a downstream conduit segment 77 that rotates with respect to the midstream conduit segment 20 about a third axis 90.

To synchronize the movement of this downstream conduit segment 77 with the movement of upstream conduit segments, a subsequent cam surface 52' can be fixed with respect to the midstream conduit segment 20 and a second cam follower 54' can be fixed on the downstream conduit segment. The primary surface of the second cam surface is centered on the second axis 75, and the secondary surface of the second cam surface has a radius corresponding to the distance from the third axis.

FIGS. 12-21 depict how additional conduit segments and synchronization elements can be added in the same way in order to achieve greater range of motion in a single plane, or for groups of multiple segments moving in differing planes.

Bilateral Arrangement

The monitor seen in FIGS. 31-34 uses a bilateral arrangement of synchronization, in which one part of the range of rotation of the midstream conduit segment 20 with respect to a downstream conduit segment is permitted at one end of the range of motion of the midstream conduit segment with respect to the upstream conduit segment/base unit 60, and the other part of the range of rotation of the midstream conduit segment with respect to the downstream conduit segment is permitted at the other end of the range of motion of the midstream conduit segment with respect to the upstream conduit segment/base unit.

In bilateral arrangements used for providing side-to-side sweep, the neutral position of the monitor may be one in which the conduit through the midstream conduit segment 20 is effectively straight through, as opposed to curved, bent, or kinked, with the outlet of the upstream conduit segment/base unit 60, the midstream conduit segment, and the downstream conduit segment (discharge element 16) all aligned with the one another in a fashion where the fluid flow from the inlet/upstream conduit segment to the downstream conduit segment/discharge element 16 is effectively coaxial.

Figure 33:
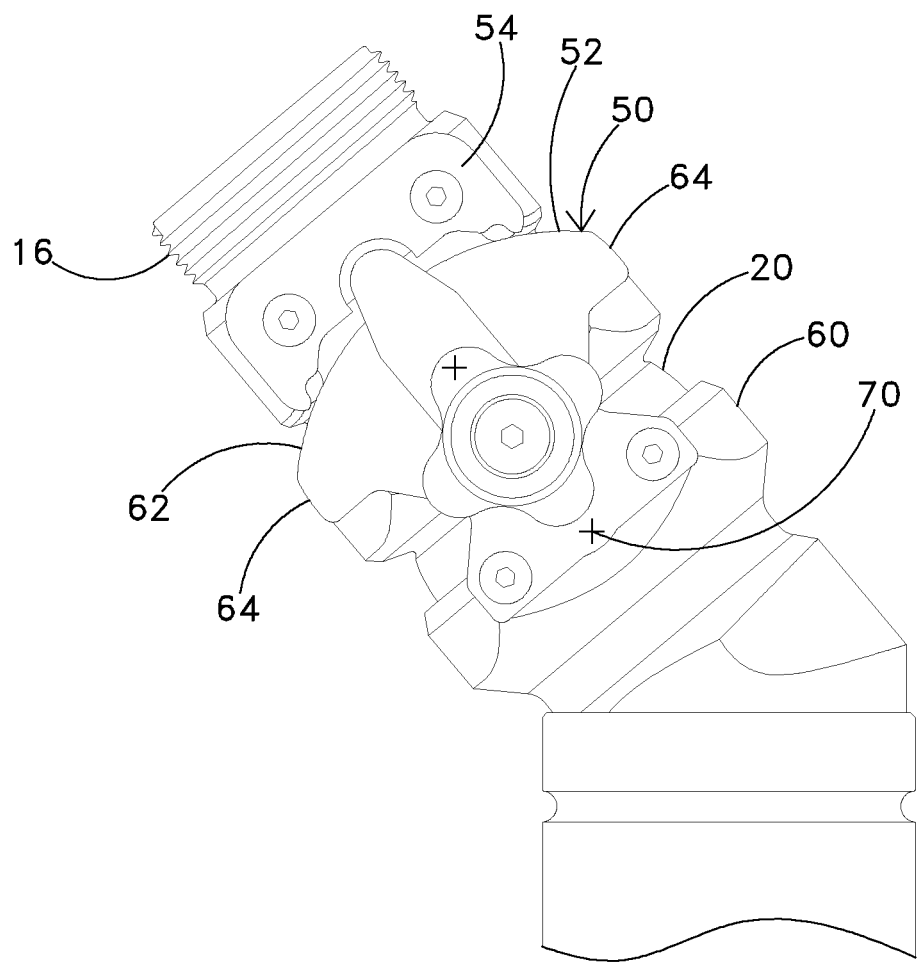
Figure 34:
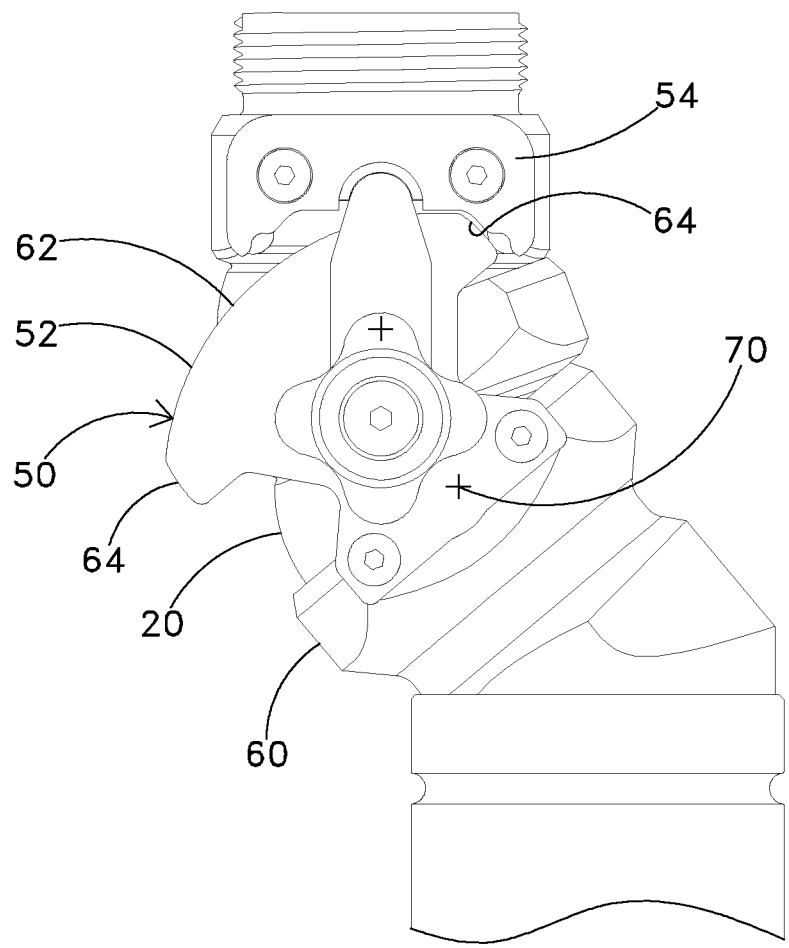

In the neutral position (mid-stroke) seen in FIG. 33, the axis of rotation for each conduit segment is directly through the center of each conduit segment. With such an arrangement, nozzle reaction force does not act upon any conduit segment unless subsequent conduit segments have offset the discharge trajectory from that axis. Thus, with the conduit segments in the neutral position, nozzle reaction force is not a significant concern. In this position, the synchronization mechanism 50 allows the conduit segment 20 to rotate with respect to the upstream conduit segment/base unit 60 throughout its entire range of travel, but inhibits rotation of downstream conduit segments (or the discharge element 16) with respect to the midstream conduit segment. Because downstream conduit segments cannot move out-of-line, the nozzle reaction forces do not tend to kink those joints with respect to one another.

In the monitor seen in FIGS. 31-34 (where the rotation is about a fixed base), at one end of the range of travel of the midstream conduit segment 20 with respect to the upstream conduit segment 60, the synchronization mechanism 50 locks the midstream conduit segment in place with respect to the upstream conduit segment, and frees a downstream conduit segment (discharge element 16) to rotate with respect to the midstream conduit segment, but only from its neutral midstroke position to one endpoint of its full range of travel. At the other end of the range of travel of the midstream conduit segment with respect to the downstream conduit segment, the synchronization mechanism again locks the midstream conduit segment in place with respect to the upstream conduit segment, and frees the downstream conduit segment to rotate from its midstroke position to the opposite endpoint of its full range of travel with respect to the midstream conduit segment. When the downstream conduit segment is bent with respect to the midstream conduit segment, nozzle reaction forces track through the center of the downstream conduit segment, and thus do not cause moment about the second axis 75. Nozzle reaction forces do create moment about the first axis 70, but those moments are restrained by the synchronization mechanism locking the midstream conduit segment in position with respect to the upstream conduit segment.

Unilateral Arrangement

A monitor that can discharge fluids at angles ranging 10 to 90 degrees above horizontal can operate nearly horizontally, giving access to extinguish fires in a home or business through the front door, or can operate vertically inside a tower, providing cooling in (for example) a refinery situation. However, when operating at low angles, the trajectory of fluid discharge can be critical to monitor stability. For these kinds of monitors, stability can be improved by a unilateral arrangement like the one seen in FIGS. 28-30, in which the full range of motion of a downstream conduit segment 20' with respect to the midstream conduit segment 20 is provided at the upper end of the range of motion of the midstream conduit segment with respect to the upstream conduit segment/base unit 60, and no range of motion between the downstream conduit segment and the midstream conduit segment is permitted when the midstream conduit segment is at the lower end of its range of motion with respect to the upstream conduit segment.

Figure 35:
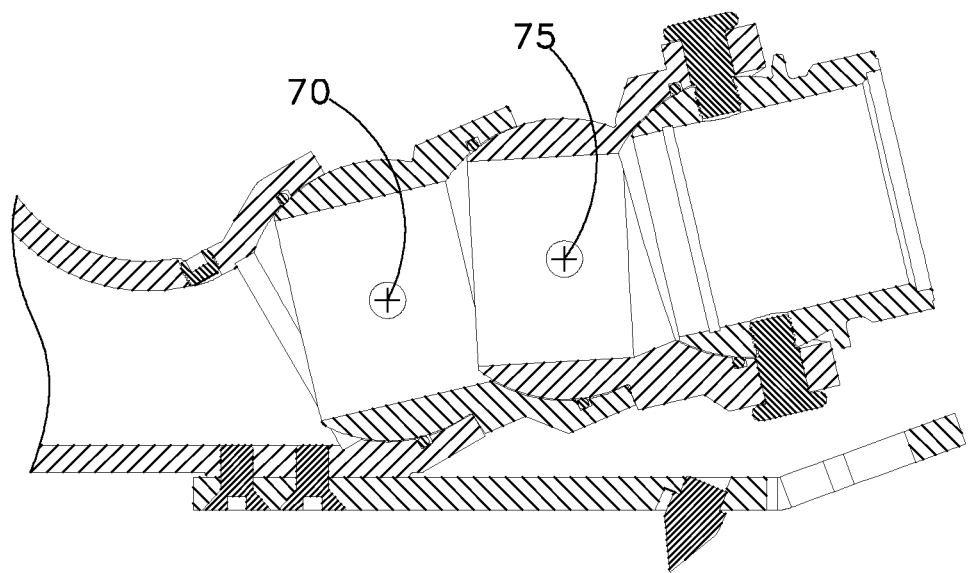
FIGS. 35-37 are cross-sectional views of the monitor seen in FIGS. 28-30.

The monitor seen in FIGS. 28-30 and 35-37 has a fully-lowered position seen in FIGS. 28 and 35. In that position, the midstream conduit segment 20 can move freely from the lower end of its range of motion with respect to the upstream conduit segment/base unit 60 while the downstream conduit segment 20' is effectively locked at the lower end of its range of motion with respect to the midstream conduit segment. The first and second axes 70 and 75 are arranged so that, when the monitor is in this position, the first and second axes are closely aligned with the nozzle reaction force (in this case, they are directly aligned with the outlet from the discharge element 16 and thus directly aligned with the nozzle reaction force). As seen in FIG. 35, the fluid path is not straight through the device, but rather has a kink, entering at one elevation and exiting at a higher elevation. In the illustrated example, this kink corresponds with the half the range of motion of the first joint, or a 20 degree offset.

This alignment of the first and second axes 70, 75 in this monitor offers improved stability over the prior art. In a monitor with a 2.5" discharge waterway operating at a ten degree angle, the arrangement of the new monitor lowers the reaction vector about one inch compared to a prior art monitor. Nozzle reaction forces in a monitor operating at 500 GPM at 100 psi is about 252 lbf, and lowering the vector by an inch can reduce the overturning moment by about 21 foot pounds. This reduction may make it practical to build a portable monitor that has a nozzle reaction vector within the polygon defined by the contact points between the ground and tips of the monitor's legs.

Figure 36:
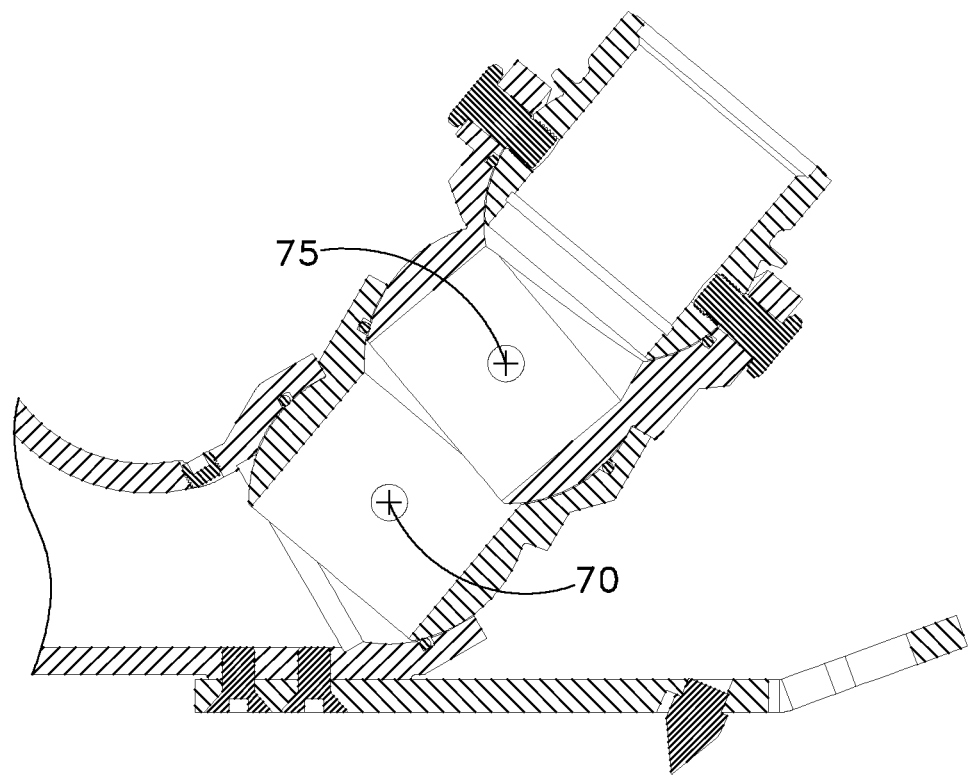
Figure 37:
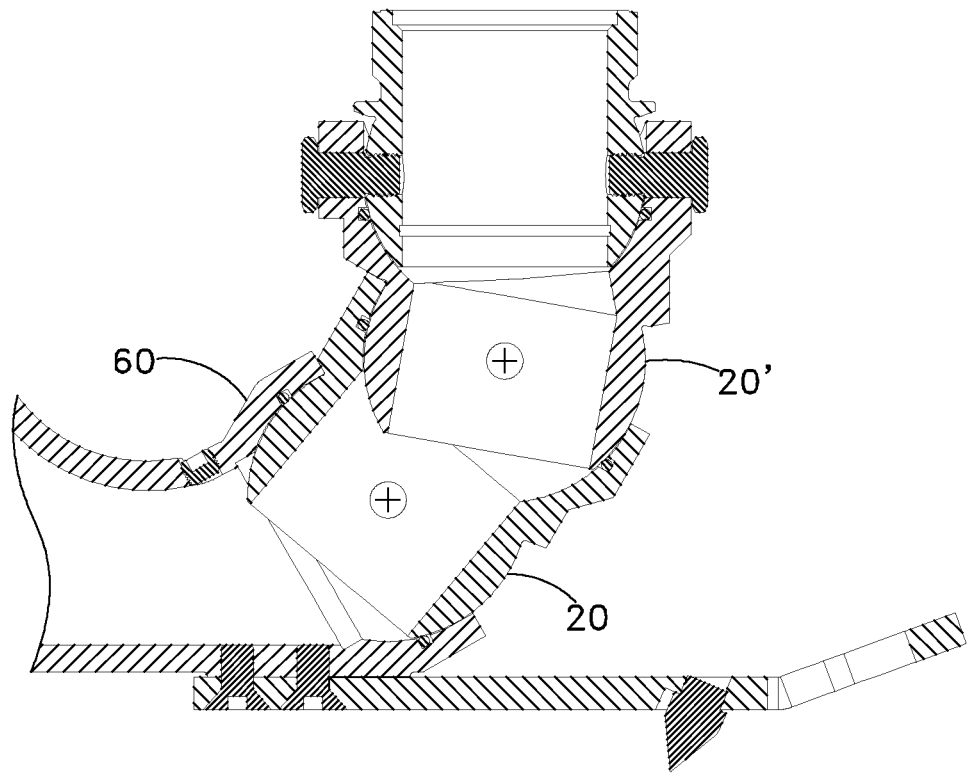

In operation, the midstream conduit segment 20 in the unilateral arrangement is permitted to rotate upwardly with respect to the upstream conduit segment/base unit 60 from its lowermost limit to its uppermost limit while rotation of the downstream conduit segment 20' with respect to the midstream conduit segment is inhibited. When the midstream conduit segment reaches its uppermost limit of rotation with respect to the upstream conduit segment, as seen in FIG. 36, the mechanism changes modes. In the new mode, seen in FIG. 37, the synchronization mechanism inhibits rotation of the midstream conduit segment with respect to the upstream conduit segment/base unit 60 while enabling free range of motion of the downstream conduit segment 20' with respect to the midstream conduit segment.

Proportional Arrangement

Figure 39:
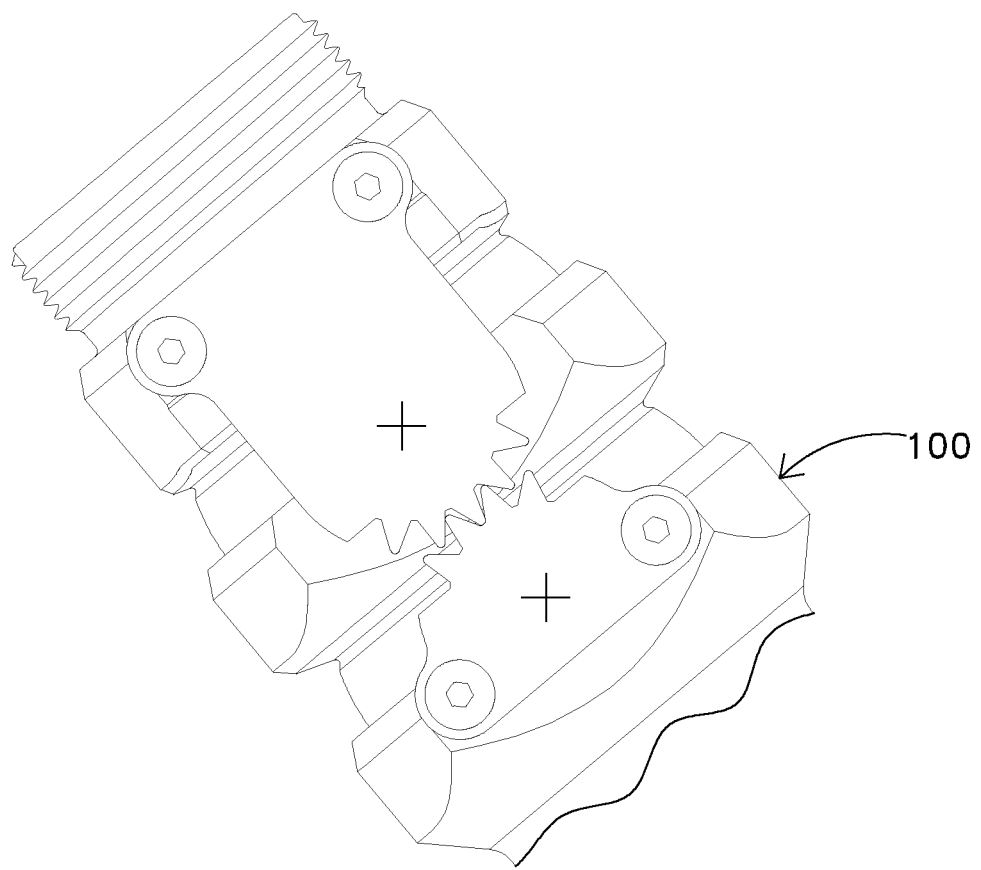
Figure 40:
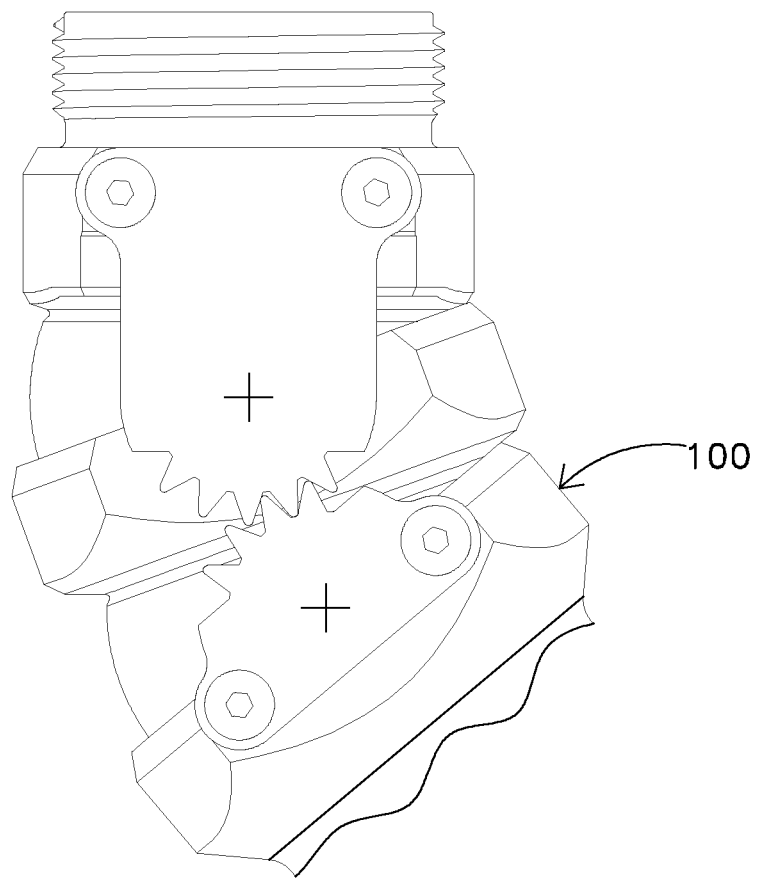

Synchronization mechanisms can also be arranged to move adjacent elements simultaneously in a manner that automatically controls rotation of the conduit segments in a proportional manner. For example, as seen in the firefighting monitor seen in FIGS. 38-40, a monitor 100 of the kind described in U.S. Pat. No. 7,644,777 is fitted with a pair of intermeshed gears that are secured to the sides of the upstream conduit segment/base unit 60 and to a downstream conduit segment 20' on opposites sides of a midstream conduit segment 20. The first gear 105 is centered on the axis 110 where the midstream conduit segment rotates with respect to the upstream conduit segment, and is fixed to the upstream conduit segment. A second gear 120 is centered on the axis 125 where the downstream conduit segment rotates with respect to the midstream conduit segment, and is fixed to the downstream conduit segment. Both conduit segments are constrained to move relative to each other and to the upstream conduit segment in accordance with the gear ratio on the intermeshed teeth. If the gears are of equal size, then the angular displacement between adjacent pairs of conduit segments is identical. If the second gear has a larger radius, then movement of the downstream conduit segment with respect to the midstream conduit segment will be only a fraction of the movement of the midstream conduit segment with respect to the upstream conduit segment/base unit.

Multiple conduit segments can be added, with the gear on one conduit segment meshing with both a gear on an upstream conduit segment (or base unit) and a gear on a downstream conduit segment.

Figure 38:
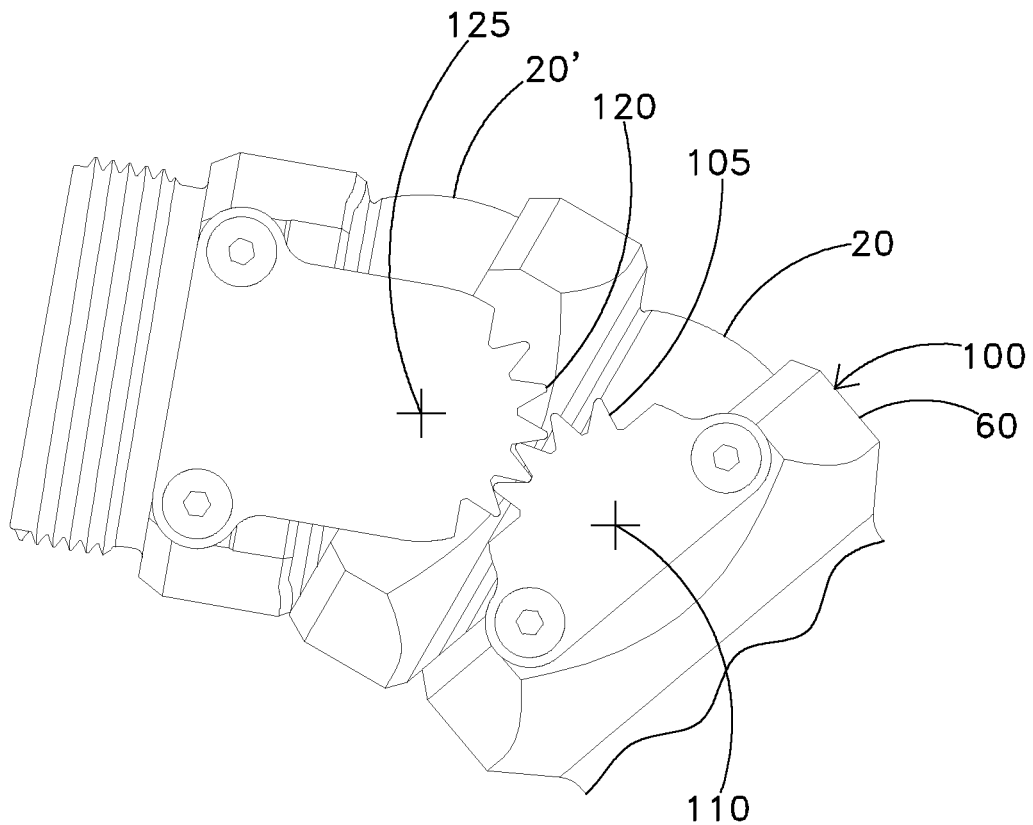
FIGS. 38-40 are perspective views of another type of firefighting monitor that uses the new invention.

The synchronized intermeshed gears depicted in FIG. 38 produce a torque on the upstream pivot from the force of nozzle reaction. Generally, this torque must be overcome by whatever actuation mechanism is used.

With a proportional arrangement, a single actuator (for example, a worm and worm wheel) on one conduit segment can be used to drive the motion of the entire series of conduit segments in a synchronized manner. Because this gearing obviates the need for individual actuators at each conduit segment, it enables a firefighter to operate the device with, for example, a conventional hand wheel or a remotely-controlled electric motor. The resulting flow path is generally far less convoluted than monitors composed of pairs of orthogonal rotary unions owing to the necessity of curving their flow path to maintain the discharge trajectory substantially coplanar with the inlet axis of rotation.

The choice of which of these three synchronization arrangements will be most appropriate for a particular monitor may depend on several factors, including size, number of degrees of freedom desired, travel desired, operating pressure, velocity, weight, reaction forces, speed, orientation with respect to gravity, and vibration. In a particular monitor with many degrees of freedom, it may be preferable to use more than one type of synchronization arrangement. It is understood that configurations other than those depicted in the figures can be obtained as desired without deviating from the scope of the invention.

This description of various embodiments of the invention has been provided for illustrative purposes. Revisions or modifications may be apparent to those of ordinary skill in the art without departing from the invention. The full scope of the invention is set forth in the following claims.

What is claimed is:

1. A firefighting monitor that has:
an upstream conduit segment;
an intermediate conduit segment that has an upstream end that is pivoted to the upstream conduit segment
a downstream conduit segment that is pivoted to a downstream end of the intermediate conduit segment; and
a lock that is fixed to the monitor and, while each part of the lock remains fixed to the monitor, moves between a first position in which the lock restrains the intermediate conduit segment from pivoting with respect to the upstream conduit segment while allowing the downstream conduit segment to pivot with respect to the intermediate conduit segment, and a second position in which the lock restrains the downstream conduit segment from pivoting with respect to the intermediate conduit segment while allowing the intermediate conduit segment to pivot with respect to the upstream conduit segment.

2. A firefighting monitor as recited in claim 1, in which the intermediate conduit segment is pivotable with respect to the upstream conduit segment only when the downstream conduit segment is restrained from pivoting with respect to the intermediate conduit segment.

3. A firefighting monitor as recited in claim 1, that also has structure that automatically restrains pivoting of one of the conduit segments with respect to a second of the conduit segment when that second conduit segment is pivotable with respect to a third of the conduit segments.

4. A firefighting monitor as recited in claim 1, in which the conduit segments can be arranged by a firefighter to provide a straight-through, linear flowpath through the conduit segments.

5. A firefighting monitor as recited in claim 1, in which:
the intermediate conduit segment pivots with respect to the upstream conduit segment about an upstream axis;
the downstream conduit segment pivots with respect to the intermediate conduit segment about a downstream axis; and
the monitor has engaging faces that automatically resist nozzle reaction forces that act between the intermediate conduit segment and the upstream conduit segment when those nozzle reaction forces create a moment about the upstream axis.

6. A firefighting monitor that has:
an upstream conduit segment;
an intermediate conduit segment that pivots with respect to the upstream conduit segment about an upstream axis;
a downstream conduit segment that pivots with respect to the intermediate conduit segment about a downstream axis; and
engaging faces that are fixed to the upstream conduit segment and to the downstream conduit segment that automatically resist nozzle reaction forces that act between the intermediate conduit segment and an adjacent conduit segment when those nozzle reaction forces create a moment about the axis between the intermediate conduit segment and the adjacent conduit segment.

7. A firefighting monitor as recited in claim 6, in which the upstream axis and the downstream axis are both horizontal.

* * * * *

UNITED STATES PATENT AND TRADEMARK OFFICE
CERTIFICATE OF CORRECTION

| | |
|---|---|
| PATENT NO. | : 9,272,171 B2 |
| APPLICATION NO. | : 13/833518 |
| DATED | : March 1, 2016 |
| INVENTOR(S) | : David J. Kolacz et al. |

Page 1 of 1

It is certified that error appears in the above-identified patent and that said Letters Patent is hereby corrected as shown below:

In the Claims:

At Column 11, line 13, "segment" should be -- segment; --.

Signed and Sealed this
Sixteenth Day of August, 2016

Michelle K. Lee
*Director of the United States Patent and Trademark Office*